(12) United States Patent
Esly et al.

(10) Patent No.: US 6,857,334 B2
(45) Date of Patent: Feb. 22, 2005

(54) MOTOR VEHICLE WITH AUTOMATIC TRANSMISSION

(75) Inventors: Norbert Esly, Bühl (DE); Volker Kretz-Busch, Bruchsal (DE); Detlef Noack, Ottersweier-Hatzenweier (DE); Martin Meunier, Calden (DE)

(73) Assignee: LUK Lamellen-und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/254,058

(22) Filed: Sep. 24, 2002

(65) Prior Publication Data

US 2003/0094328 A1 May 22, 2003

Related U.S. Application Data

(63) Continuation of application No. PCT/DE01/01128, filed on Mar. 22, 2001.

(30) Foreign Application Priority Data

Mar. 28, 2000 (DE) .......................................... 100 15 374
Mar. 29, 2000 (DE) .......................................... 100 15 720
May 17, 2000 (DE) .......................................... 100 24 187

(51) Int. Cl.$^7$ ................................................ F16H 63/00
(52) U.S. Cl. ...................................... 74/335; 74/473.12
(58) Field of Search .............................. 74/335, 473.12, 74/606 R; 403/122, 123, 137, 28, 29, 30

(56) References Cited

U.S. PATENT DOCUMENTS

| | | | | |
|---|---|---|---|---|
| 1,416,188 A | * | 5/1922 | Garman ..................... 74/579 R |
| 2,687,024 A | * | 8/1954 | George ........................ 464/112 |
| 4,020,715 A | * | 5/1977 | Sollars ...................... 74/606 R |
| 4,428,248 A | * | 1/1984 | Broucksou et al. ............ 74/335 |
| 4,528,867 A | * | 7/1985 | Semba et al. .............. 74/606 R |
| 4,550,625 A | * | 11/1985 | Martin et al. .................. 74/335 |
| 4,570,765 A | * | 2/1986 | Makita ....................... 192/3.56 |
| 4,791,831 A | * | 12/1988 | Behnke et al. ............. 74/606 R |
| 4,805,472 A | * | 2/1989 | Aoki et al. .................... 74/335 |
| 4,912,997 A | * | 4/1990 | Malcolm et al. .............. 74/335 |
| 5,180,959 A | * | 1/1993 | Christopher ................ 318/626 |
| 5,189,924 A | * | 3/1993 | Altenheiner et al. ...... 74/473.12 |
| 5,564,853 A | * | 10/1996 | Maughan ..................... 403/137 |
| 5,875,679 A | * | 3/1999 | Salecker et al. .............. 74/335 |
| 6,003,395 A | * | 12/1999 | Rogg et al. .................... 74/335 |
| 6,062,097 A | * | 5/2000 | Imao et al. ............... 74/473.12 |
| 6,065,363 A | * | 5/2000 | Schaller et al. .......... 74/473.12 |
| 6,082,213 A | * | 7/2000 | Skogward ................ 74/473.18 |
| 6,321,612 B1 | * | 11/2001 | Leimbach et al. ............ 74/335 |
| 6,386,787 B1 | * | 5/2002 | Reichelt ...................... 403/140 |
| 6,523,857 B1 | * | 2/2003 | Hopton et al. ............... 280/756 |

FOREIGN PATENT DOCUMENTS

| | | | |
|---|---|---|---|
| DE | 197 06 214 A | 4/1998 | |
| DE | 198 23 767 A | 12/1998 | |
| DE | 199 04 022 A | 8/1999 | |
| FR | 2818710 A1 | * 6/2002 | ............. F16D/3/64 |

* cited by examiner

Primary Examiner—Roger Pang
Assistant Examiner—David D. Le
(74) Attorney, Agent, or Firm—Henry M. Feiereisen

(57) ABSTRACT

The invention relates to a motor vehicle having a power train wherein the engine can drive an automatic transmission by way of an automatic clutch. The gear ratio of the transmission is selectable by a first drive and a second drive is employed to shift the transmission into the selected gear. The two drives are mounted on the transmission case by way of a common base plate. Novel kinematic transmission lines connect the drives to the ratio selecting and gear shifting components of the transmission. One of the transmission lines employs a transmission stage, a carrier for translation of rotary movement into axial movement, and an element for transfer of axial movement to the transmission. The translation of movement of the drive in a selection process takes place by way of two transmission stages.

58 Claims, 18 Drawing Sheets

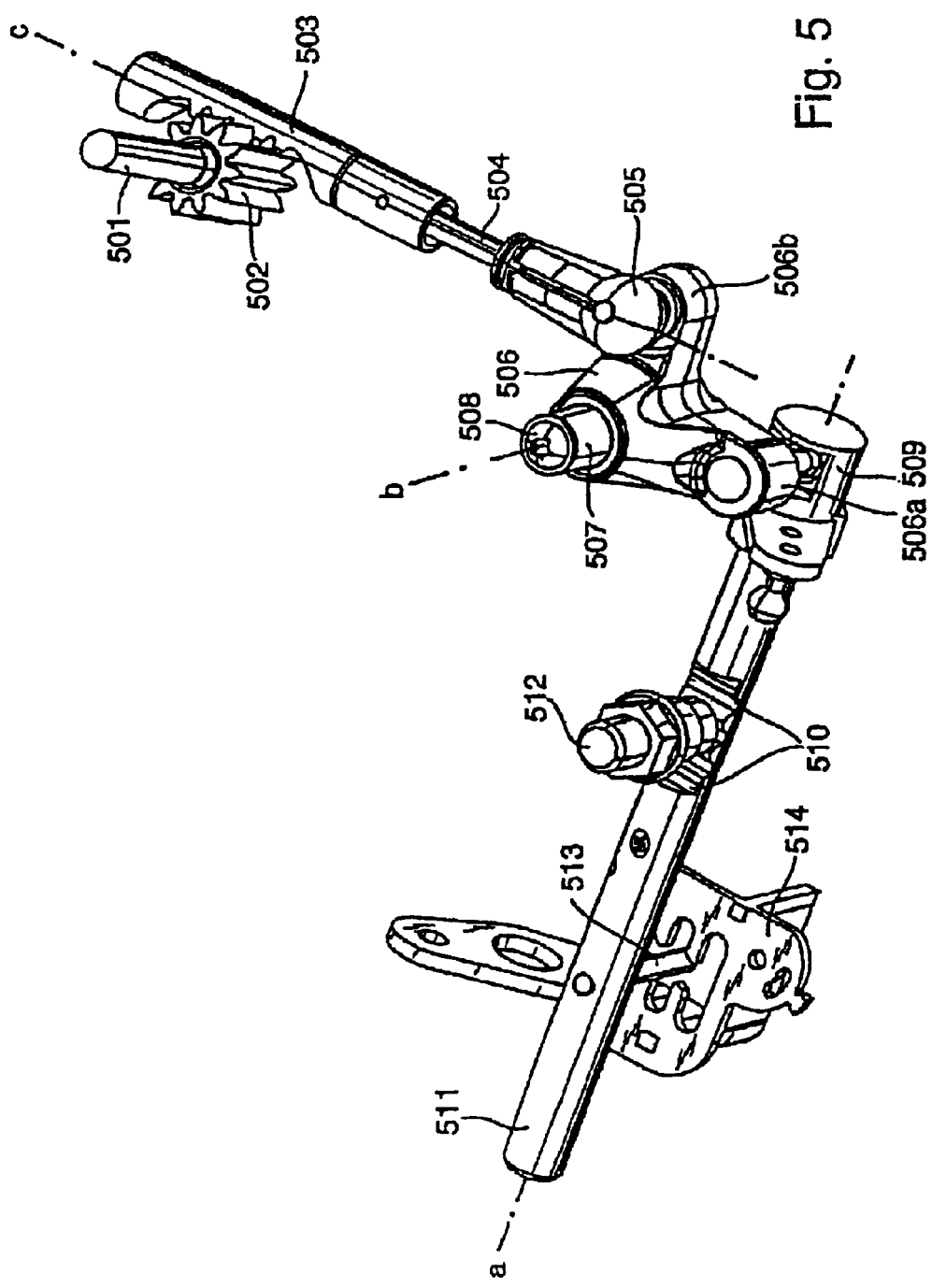

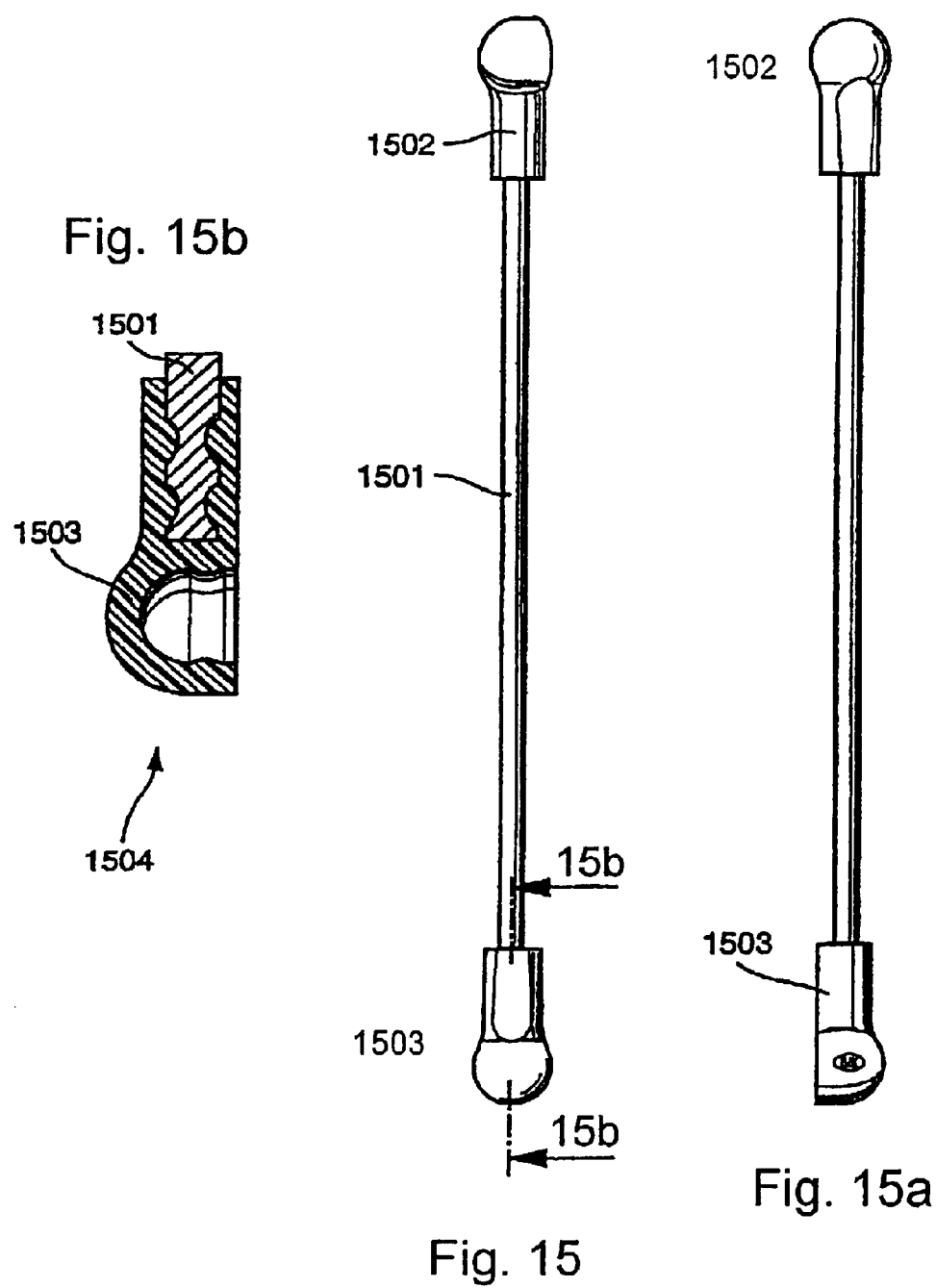

MOTOR VEHICLE WITH AUTOMATIC TRANSMISSION

CROSS-REFERENCE TO RELATED CASES

This application claims the priorities of commonly owned German patent applications Serial Nos. 100 15 374.74 (filed Mar. 28, 2000), 100 150 720.3 (filed Mar. 29, 2000) and 100 24 187.5 (filed May 17, 2000) and is a continuation of commonly owned International patent application Serial No. PCT/DE01/001128 (filed Mar. 22, 2001). The disclosures of the above-referenced patent applications, as well as those of all US and foreign patents and patent applications identified in the specification of the present application, are incorporated herein by reference.

BACKGROUND OF THE INVENTION

This invention relates to improvements in motor vehicles, and more particularly to improvements in power trains for motor vehicles. Still more particularly, the invention relates to improvements in power trains of the type wherein a prime mover (such as an internal combustion engine) can drive a change-speed transmission by way of a torque transmitting device (e.g., a friction clutch), wherein discrete first and second actuating means are respectively provided for the transmission and the torque transmitting device, and wherein a control unit is associated with and can automatically control the first actuating means as well as the torque transmitting device. As a rule, actuation of such change-speed transmission involves the resort to two components of movement, namely a so-called gear or gear ratio selector component and a gear shifting component.

It is already known to employ a first drive which can be operated to select a particular gear ratio, and a discrete second drive which shifts the transmission into a selected gear. The movements which are generated or transmitted by the two drives are respectively converted into or transmitted in the form of rotary and translatory movements of the gear shifting shaft of the transmission with attendant changes of the covered distance and of the applied forces.

A drawback of presently known power trains of the above outlined character is that the operative connections between the drives and the gear shifting shaft of the transmission are less than satisfactory, at least during certain stages of operation of the prime mover. The requirements upon the movement- or distance-selecting or imparting and upon the force-transmitting constituents, upon the speed and duration of the gear shifting movement, as well as upon the comfort to the occupant(s) of the motor vehicle during shifting render it necessary to resort to complex and hence expensive designs which occupy substantial amounts of space and the installation of which in a motor vehicle involves much labor and considerable additional expenses.

OBJECTS OF THE INVENTION

An object of our invention is to provide a relatively simple and compact power train the parts of which can be produced and assembled at a relatively low cost.

Another object of the present invention is to provide a power train wherein the change-speed transmission can be assembled and operated in a novel and improved manner.

A further object of the invention is to provide a novel and improved automated transmission or gearing for use in the power train of a motor vehicle.

An additional object of the instant invention is to provide a novel and improved gear ratio selecting and establishing or shifting arrangement for use in conjunction with an automatic transmission.

Still another object of the present invention is to provide an automatic transmission which is designed to confrom to the required distance and/or force requirements, which can be rapidly shifted into or from a selected gear, whose operation does not cause discomfort to the operator of the motor vehicle and/or to other occupants, and which is assembled of a relatively small number of relatively simple and inexpensive component parts.

A further object of the invention is to provide novel and improved means for mounting the transmission gear selecting and shifting means on the case or housing of a change-speed transission.

Another object of the invention is to provide a novel and improved arrangement which can select the gear of and can shift the transmission into a selected gear by resorting to novel and improved parts or groups of parts which are compact, the overall number of which is small and which can be combined with available types of change-speed transmissions.

An additional object of this invention is to provide novel and improved universal and analogous joints for use in a power train which employs the above outlined transmission and transmission actuating means.

Still another object of the present invention is to provide novel and improved methods of and means for mounting transmission ratio selecting and transmission actuating means on the case or housing of an automatic transmission in the power train of a motor vehicle.

A further object of the invention is to provide a novel and improved method of combining the transmission gear selecting means with the transmission gear shifting means in the power train of a motor vehicle.

Another object of our invention is to provide novel and improved devices for use in the transmission actuating means in the power train of a motor vehicle.

An additional object of the invention is to provide novel and improved control means for automated transmissions and torque transmitting means (such as friction clutches) which can be utilized in the power trains of motor vehicles.

A further object of the invention is to provide novel and improved combinations of gears, toothed racks, shafts, levers, joints, wipers and other mechanical parts for use in the means for selecting the gears of automatic transmissions and for shifting such transmissions into selected gears.

SUMMARY OF THE INVENTION

One feature of the present invention resides in the provision of a motor vehicle embodying a power train which includes a prime mover (e.g., an internal combustion engine), a variable-speed transmission having a plurality of speeds or ratios (e.g., forward speeds 1 to 5, a reverse speed and a neutral position), a torque transmitting unit (such as a friction clutch) which is actuatable to connect a rotary output element (e.g., a camshaft or a crankshaft) of the prime mover with a rotary input element of the transmission, means for actuating the torque transmitting unit, and means for varying the speed of the transmission including a first drive for selecting one of the transmission ratios and a second drive for shifting the transmission into the selected ratio. One of the drives includes means for transmitting rotary movements and the other drive includes means for transmitting translatory (such as axial) movements, and the power train further includes automatic control means for the actuating means and for the speed varying means, means for transmitting signals to the control means (e.g., a sensor which transmits signals denoting the positions of a manually operable gear shifter), and kinematic transmission lines which can connect the drives of the speed varying means with the transmission. The kinematic transmission lines include means for converting rotary movements transmitted by the one drive into translatory movements, and means for converting translatory movements constituting converted rotary movements into rotary movements.

The means for converting rotary movements which are transmitted by the one drive can include a worm and a worm wheel mating with the worm, and the means for converting translatory movements can include a pivotable selector arm and an axially movable coupling rod which connects the worm or the worm wheel with the pivotable selector.

The means for varying the speed of the transmission can further include a support (such as a base plate) which mounts at least a portion of at least one of the converting means on the housing or case of the transmission.

The base plate can serve to mount the drives on the transmission case. One of the drives can include a rotary worm wheel which is supported by the base plate. The latter can be provided with a compartment for at least one of the drives.

The means for securing the base plate to the transmission case can include an element which turnably mounts a shifting lever of the kinematic transmission lines. The element can constitute a pin or bolt or shaft which is provided with a radially outwardly extending head, collar or an analogous projection so that it can transmit tensioning forces.

The means for converting rotary movements transmitted by the one drive can include an entraining member which is rotatable about a predetermined axis, an axially movable motion transmitting member and an eccentric which connects the entraining member with the motion transmitting member. The eccentric can include or constitute a universal joint.

One of the transmission ratios can be defined by a spur gear and a toothed rack. One of the drives can include a resilient arrangement and the spur gear is or can be plugged into the resilient arrangement.

One of the converting means can include a toothed rack comprising a first portion which includes the teeth of the toothed rack and a second portion. The material of the first portion has a first melting point and the material of the second portion has a second melting point lower than the first melting point. One of the converting means can include a pivotable lever which serves to transmit tension-free translatory movements and receives motion from the second portion of the toothed rack. The lever is preferably arranged to receive motion from the second portion of the toothed rack by way of an elongated push rod consisting at least in part of a material having a melting point higher than the second melting point. The one converting means can further include universal joints connecting one portion of the toothed rack with the lever, and at least one of the universal joints can include a ball and a socket receiving the ball for swivelling movement relative thereto.

As already mentioned hereinbefore, at least one of the converting means can comprise at least one universal joint including a spherical head and a complementary socket which receives the spherical head with freedom of swivelling movement. The head and/or the socket can constitute an article made in a casting or injection molding machine. The at least one joint can connect a toothed rack of the at least one converting means with a pivotable lever and such rack can include or constitute a casting which is of one piece with the head or with the socket of the at least one joint. Such one converting means preferably further includes a member which carries the socket or the head of the universal joint.

The converting means can include at least one toothed rack and a member for tension-free transmission of transmission-shifting movements. The rack and/or the just mentioned member can consist, in its entirety, of a plastic material.

The just discussed converting means can further include means for articulately connecting the toothed rack with the member which transmits transmission-shifting movements. The toothed rack, the member and the connecting means preferably consist of a material which can stand temperatures arising in actual use of the change-speed transmission without affecting the articulate connection between the toothed rack and the member.

If the converting means includes at least one joint having a sphere and a complementary socket for the sphere, the joint can further include a pasty substance (such as wax) which is provided between the sphere and the socket.

The sphere and/or the complementary socket of a joint in the converting means can constitute a casting which has undergone a predetermined cooling treatment which enhances at least one desirable quality of the casting.

It is often advisable to ensure that at least a portion of the sphere in the universal joint of the converting means be made of a plastic material which undergoes minimal shrinkage in response to cooling. This ensures that the joint can operate without any or without appreciable play.

If at least one of the converting means includes a toothed rack, the pitch circle of teeth forming part of such toothed rack is preferably disposed in a plane which is at least close to the axis of the toothed rack.

One of the converting means can include a pivotable shifting lever, a mobile shifting shaft, an element for transmission of motion from the lever and a crosshead for transmission of motion between the motion transmitting element and the shifting shaft.

One of the converting means can be arranged to select transmission ratios and the change-speed transmission can include a shifting shaft. Each of the converting means can further include a plurality of components and each such plurality can include a last component connected with the shifting shaft. The last component of one of the converting means can constitute the last component of the other converting means.

The converting means can be mechanically coupled to each other so that an actuation of one of the converting means entails an actuation of the other converting means, preferably without constituting a departure from a predetermined mode of operation of the other converting means.

One of the converting means can be arranged to select desired ratios of the transmission and the other converting means is then arranged to shift the transmission into a selected gear or ratio. The two converting means can be operatively connected to each other in such a way that an actuation of the other converting means entails no actuation or at most negligible actuation of the one converting means.

The kinematic transmission lines can be arranged to operate with a plurality of plays, one of the converting means can be arranged to select the ratio of the transmission and the other converting means can be operatively connected with the one converting means and can be arranged to shift the transmission into a selected ratio. An actuation of the other converting means can entail a change in the position of the one converting means which is less than the sum of the aforementioned plays.

Another feature of the present invention resides in the provision of a motor vehicle embodying a power train which, as in the aforedescribed vehicle, includes a prime mover, a variable-speed transmission having a plurality of gears or ratios, a torque transmitting unit actuatable to connect a rotary output element of the prime mover with a rotary input element of the transmission, means for actuating the torque transmitting unit, and means for varying the speed of the transmission including a first drive for selecting one of the ratios or gears or speeds and a second drive for shifting the transmission into the selected ratio or gear or speed. One of the drives includes means for transmitting rotary movements and the other drive includes means for transmitting translatory movements, and the power train further includes automatic control means for the actuating means and the speed varying means. In contrast to the first described vehicle, the kinematic transmission line which connects the drives with the transmission of the modified power train includes means for converting movements transmitted by the second drive into movements entailing a shifting of the transmission into a selected ratio and comprising a first stage receiving motion from the second drive, an elastic shifting device, a second stage receiving motion from the elastic shifting device and having means for converting rotary movements into translatory movements, an element for tension-free transmission of translatory movements, and a pivotable lever operatively connected with the just mentioned element and arranged to transform rotary movements into axial shifting movements.

One of the stages in the modified kinematic transmission line preferably includes a worm and a worm wheel mating with the worm, and the other stage of such kinematic transmission line can include a pinion and a toothed rack mating with the pinion.

A base plate is preferably provided to mount the first and second drives of the modified power train. The aforementioned worm and worm wheel can be mounted on the base plate. The base plate can be mounted on a housing or case of the transmission and can be provided with a compartment for a portion (such as the first gear) of the transmission. Furthermore, the base plate can be provided with one or more openings in the form of windows which are dimensioned and configurated to afford access to one or more selected portions of the transmission. Still further, the base plate can be provided with at least one reinforcement, e.g., in the form of one or more ribs or the like.

The means for securing the base plate to the transmission case can include a set of rivets and/or screws, bolts and/or other threaded fasteners. The base plate can constitute a casting having the aforementioned reinforcing means preferably in the form of ribs or the like. The ribs can be provided with openings and the orientation of the ribs can be such that, during casting, the ribs can be provided with openings without necessitating resort to auxiliary casting tools such as pushers, cores and/or the like.

The means for securing the base plate to the transmission case can include an element which turnably mounts a shifting lever of the kinematic transmission line. The securing means can be affixed to the base plate and/or to the transmission case under tension to thus reduce the likelihood of unintentional separation.

A further feature of the instant invention resides in the provision of a power train which is intended for use in a motor vehicle and comprises a prime mover, a variable-speed transmission having a plurality of ratios (such as several forward speeds, a reverse speed and a neutral position), a torque transmitting unit which is actuatable to connect a rotary output element of the prime mover with a rotary input element of the transmission, means for actuating the torque transmitting unit, and means for varying the speed or ratio of the transmission. Such speed varying means includes a first drive which serves to select one of the transmission ratios and a second drive for shifting the transmission into the selected ratio. Each of the drives includes means for transmitting rotary movements and the power train further includes automatic control means for the actuating means and the speed varying means. The kinematic transmission line of the power train connects the drives with the transmission and includes a first stage arranged to receive motion from one of the drives and to transmit rotary motion, a second stage which is driven by the first stage and is arranged to convert rotary motion into translatory motion, an element for tension- or stress-free transmission of translatory motion, a ratio selecting shaft which is installed downstream of the just mentioned element, and a lever which is connected with the shaft.

The first stage preferably includes a worm and a worm wheel mating with the worm, and the second stage can include a toothed rack and a spur gear meshing with the rack.

An additional feature of the invention resides in the provision of a power train which is constructed and assembled in the same way as the just discussed power train except that it comprises a different kinematic transmission line having a first stage provided with means for converting the movements transmitted by one of the drives into shifting movements, an elastic element downstream of the first stage, a second stage disposed downstream of the elastic element and having means for converting rotary movements into translatory movements, a first element for tension- or stress-free transmission of translatory movements furnished by the second stage, a motion transmitting wiper or lever, a transmission shifting shaft, a shifting lever on the shaft, and a second element for the transmission of translatory motion from the first element to the shaft or the shifting lever.

The first stage is or can be integrated into that drive which transmits shifting movements thereto, and such first stage can include a worm and a worm wheel mating with the worm. The second stage can include a toothed rack and a pinion which mates with the toothed rack.

The elastic element can be integrated into one of the drives.

The novel features which are considered as characteristic of the invention are set forth in particular in the appended claims. The improved power train itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

FIG. 5 is a similar perspective view of the kinematic chain or train of the gear shifting means;

FIG. 6bb is an elevational view of the joint which is shown in FIG. 6b;

FIG. 6cc is another view of the element which is shown in FIG. 6c;

FIG. 7b is a plan view of the structure which is shown in FIG. 7a;

FIG. 12 is an elevational view of a resilient arrangement of the second drive in the transmission shown in FIGS. 2 and 3;

FIG. 12a is a sectional view as seen in the direction of arrows from the line 12a—12a of FIG. 12;

FIG. 12b is a sectional view as seen in the direction of arrows from the line 12b—12b of FIG. 12a;

FIG. 15 is an elevational view of a rod-shaped element which can be utilized to transmit axial gear selecting movements in the transmission of the present invention;

FIG. 15a is another elevational view of the rod-shaped gear selecting movements transmitting element which is shown in FIG. 15;

FIG. 15b is an enlarged fragmentary sectional view as seen in the direction of arrows from the line 15b—15b in FIG. 15;

DESCRIPTION OF PREFERRED EMBODIMENTS

Figure 1:
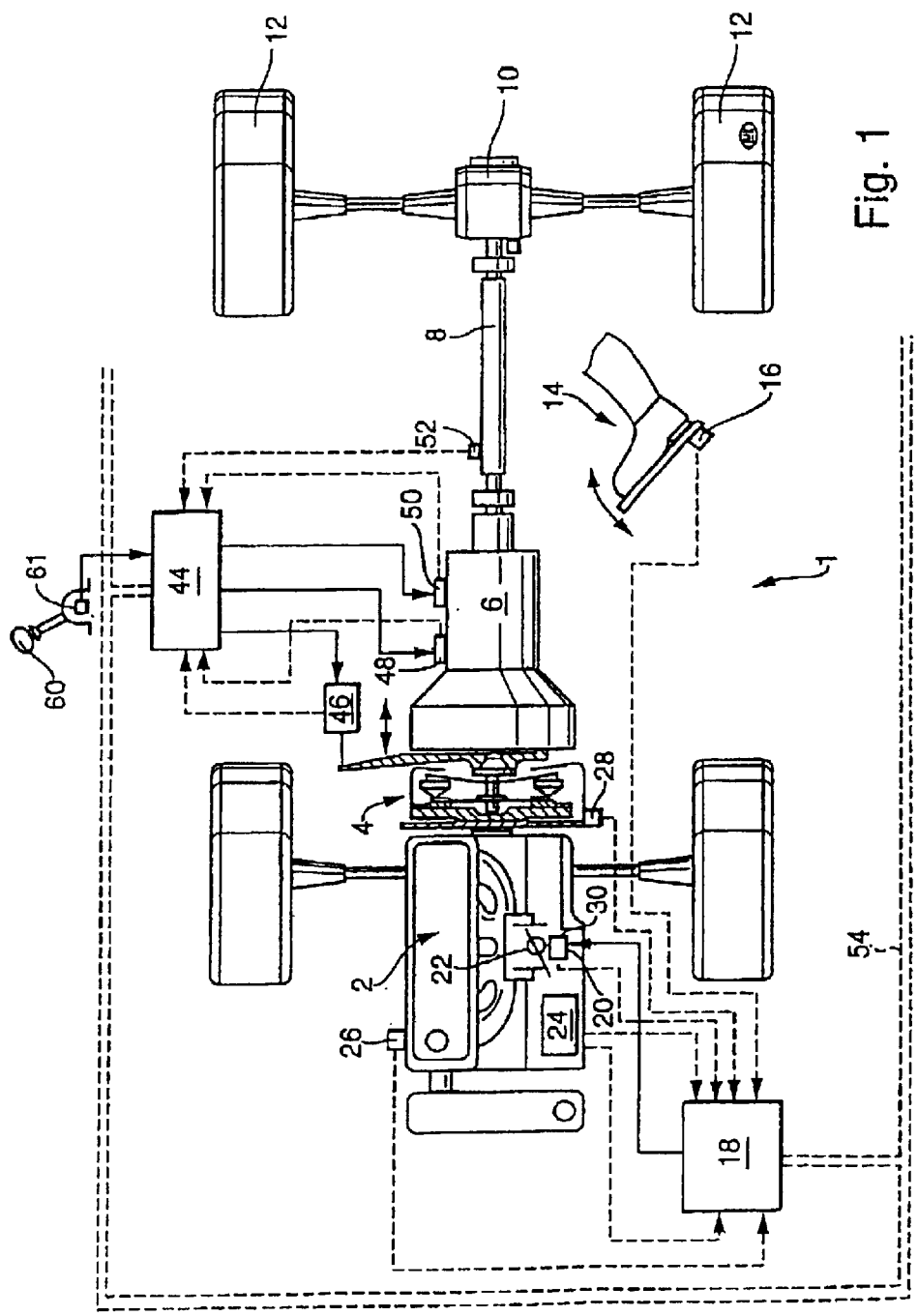
FIG. 1 is a partly schematic partially plan and partially sectional view of a portion of a motor vehicle wherein the power train includes a transmission with gear selecting and gear shifting means embodying one form of the present invention.

FIG. 1 shows certain relevant details of a motor vehicle 1 having a power train including a prime mover 2 which can include or constitute an internal combustion engine. The power train further includes a torque transmitting device 4, here shown as a friction clutch, and a change-speed transmission or gearing 6. The latter can transmit torque to a Cardan shaft 8 which can drive the wheels 12 through the medium of a differential 10. It goes without saying that the power train which embodies the present invention can be designed to drive a different number of wheels; for example, the motor vehicle can be equipped with a four-wheel drive.

The means for changing the ratio of the transmission 6 comprises a manually operable gear shifter 60, e.g., a gear ratio selecting lever which can transmit signals to a schematically represented control unit 44 by way of a customary sensor 61. The control unit 44 forms part of a composite control system further including a second schematically shown control unit 18. The illustrated composite control unit 18, 44 can be replaced with a one-piece control unit, i.e., its constituents need not be structurally and/or functionally spaced apart from each other in a manner as shown in FIG. 1. A CAN-bus 54 or an equivalent thereof can be provided to establish one or more electrical connections for the exchange of data between the illustrated units 18 and 44. For example, the composite control unit 18, 44 can serve to regulate the automated actuation of the transmission 6 and/or of the friction clutch 4 or of the engine 2, e.g., the engine torque, the selection of the transmission ratio, a parking position, a neutral position of the transmission or the torque which the friction clutch can or should transmit.

The arrangement for changing the ratio of the transmission 6 comprises at least one actuator (FIG. 1 shows two actuators 48, 50) and the control unit 44. The ratio of the transmission 6 can be changed in response to activation of the actuators 48, 50. A further actuator 46 can serve to automatically actuate the friction clutch 4.

The control unit 44 is set up to receive signals which are at least indicative or representative of the extent of engagement of the clutch 4 and of the ratio of the transmission 6, as well as to receive signals transmitted by a sensor 52 and representing the RPM of the Cardan shaft 8 (i.e., the RPM of the output element of the transmission 6). Still further, the control unit 44 can receive signals from the aforementioned sensor 61 which monitors the position of the gear ratio selecting lever 60, i.e., the selected ratio of the transmission 6. A further sensor can monitor the setting of the clutch 4, e.g., the distances covered by a mobile part of the clutch. The latter can be of the type disclosed, for example, in commonly owned U.S. Pat. No. 5,487,704 to Friedmann et al. or in commonly owned U.S. Pat. No. 5,634,541 to Maucher.

The control unit 18 transmits signals to the combustion engine 2, e.g., by causing changes in the condition of a throttle valve 30 and/or of a fuel injection system (not shown) This control unit can receive signals from a sensor 26 which monitors the pressure in the suction pipe, from a sensor 24 serving to monitor the temperature of the coolant (such as water) for the engine 2, from a sensor 28 which monitors the RPM of the engine, from a sensor 20 which monitors the position of a movable component (such as the pivotable flap 22) of the throttle valve 30 and/or from a sensor 16 which monitors the position of the gas pedal 14.

The means for varying the ratio of the transmission 6 comprises at least one drive or actuator (FIG. 1 shows two drives or actuators 48, 50), and each drive can include a discrete electric motor. The arrangement can be such that one of the electric motors is actuatable to initiate the selection of the gear or gear ratio of the transmission 6 and the other electric motor is actuatable to effect or initiate the shifting of the transmission into a selected gear. To this end, each of the two electric motors can be arranged to move at least one selecting or shifting element of the transmission 6 along a gear ratio selecting path or along a gear shifting path (all this will be described in greater detail hereinafter).

Figure 2:
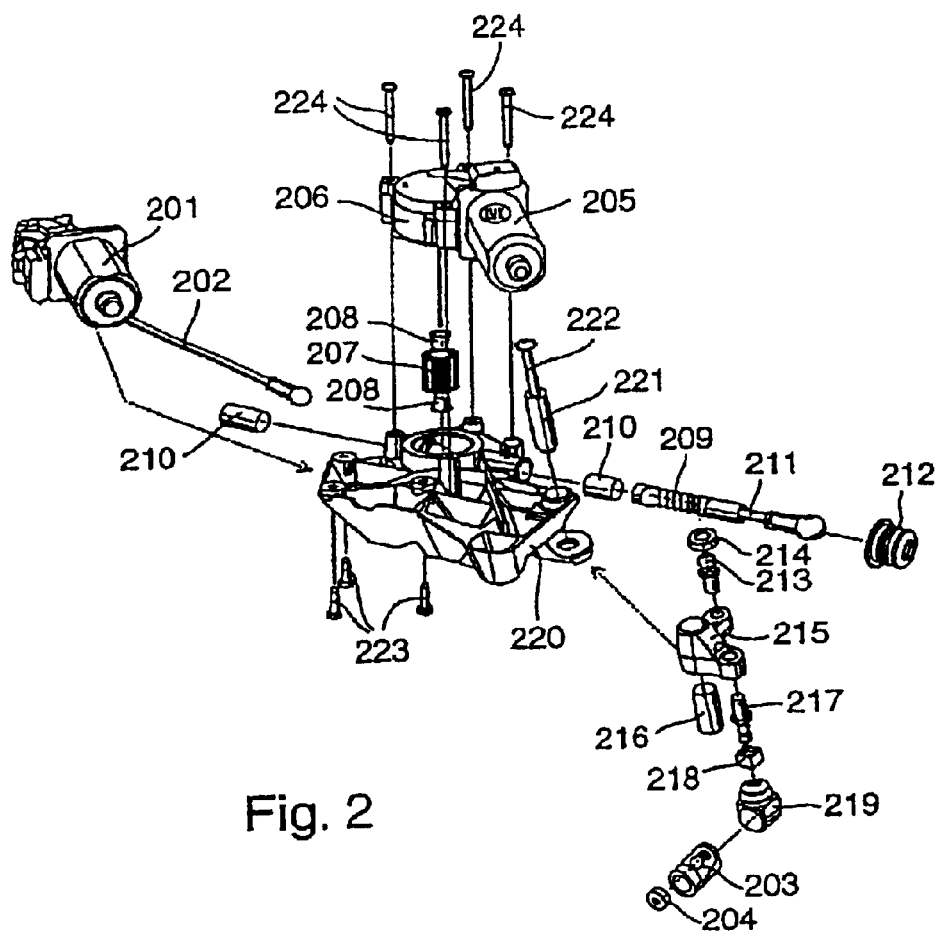
FIG. 2 is an exploded perspective view of the transmission actuating means.

FIG. 2 is an exploded perspective view of one presently preferred embodiment of the novel transmission actuating or operating or adjusting arrangement. This arrangement comprises a central element or core member in the form of a base plate 220 which carries a first drive (such as a first electric motor) 201 for the selection of the transmission ratio and a second drive (such as a second electric motor) 205 for the shifting of the transmission into a selected gear. The first drive 201 is affixed to the base plate (also called baseplate) 220 by a set of threaded fasteners (e.g., screws or bolts) 223, and similar threaded fasteners 224 are provided to affix the second drive 205 to the base plate 220. The character 203 denotes a gear selector arm which receives motion from the first drive 201 by way of a coupling rod 202. In order to avoid the development of stresses in the kinematics of the arrangement including the coupling rod 202, the connection(s) between the part 202 on the one hand and at least one of the parts 201, 203 on the other hand includes or include one or more universal joints (such as spherical heads and hollow spherical sockets). For example, such a universal joint can be provided between the left-hand end portion of the coupling rod 202 and an entraining member of the first drive 201.

The transmission of gear shifting movements from the second drive 205 to the gear selector arm 203 takes place by way of a rotary gear 207 (e.g., a spur gear) which mates with a reciprocable toothed rack 209. The means for transmitting such gear shifting movements further includes a connecting element 211 and a shifting lever 215 mounted on the gear selector arm 203. The gear 207 is rotatable in bearing sleeves 208 which can be made of a suitable plastic material.

The second drive 205 comprises an integrated resilient arrangement 206 which can be of the type identical with or similar to that shown in FIG. 12 and which will be described in detail hereinafter.

The toothed rack 209 of FIG. 2 is reciprocable in two coaxial bearing sleeves 210 which are borne by the base plate 220. A bellows 212 is provided to reduce the likelihood of contamination of (such as gathering of dust and/or other impurities on) the teeth of the toothed rack 209; this bellows is also mounted on the base plate 220.

The shifting lever 215 is pivotable relative to the base plate 220 on or with a hollow cylindrical pin or shaft 221 which can further serve as a means for receiving the shank of a screw or bolt 222 which secures the base plate to a component part (such as the case or housing) of the transmission (e.g., the transmission 6 in the power train of the motor vehicle 1 shown in FIG. 1). The shifting lever 215 is rotatable with or relative to a coaxial bearing sleeve 216 which surrounds the shaft 221. The character 217 denotes a member (such as a spherical head) which couples the crosshead 218 to the shifting lever 215.

The connecting element 211 is coupled to the shifting lever 215 by a spherical head 213. An annular member 214 (such as a plastic ring) serves to reduce the likelihood of contamination of the articulate connection including the spherical head 213 for the connecting element 211. The crosshead 218 is mounted in and serves to transmit force to the gear selector arm 203, preferably without undue tensioning and/or other undesirable stressing. A bellows 219 of rubber or the like serves to shield the selector arm 203 and preferably also one or more additional parts. An annular member 204 at the gear selector arm 203 also serves to reduce the likelihood of contamination of the adjacent portion(s) of part(s) (such as the coupling rod 202) in the structure of FIG. 2.

As used herein, the term base plate (or baseplate) is intended to encompass all suitable forms of carriers or supports or holders which may but need not be flat, i.e., which may but need not have constant thicknesses. All that counts is that such base plate be designed to adequately mount the components of the transmission actuating means on the case or housing of the variable speed transmission in the power train of a motor vehicle. This base plate is or can be directly or indirectly secured to the transmission case.

Figure 3:
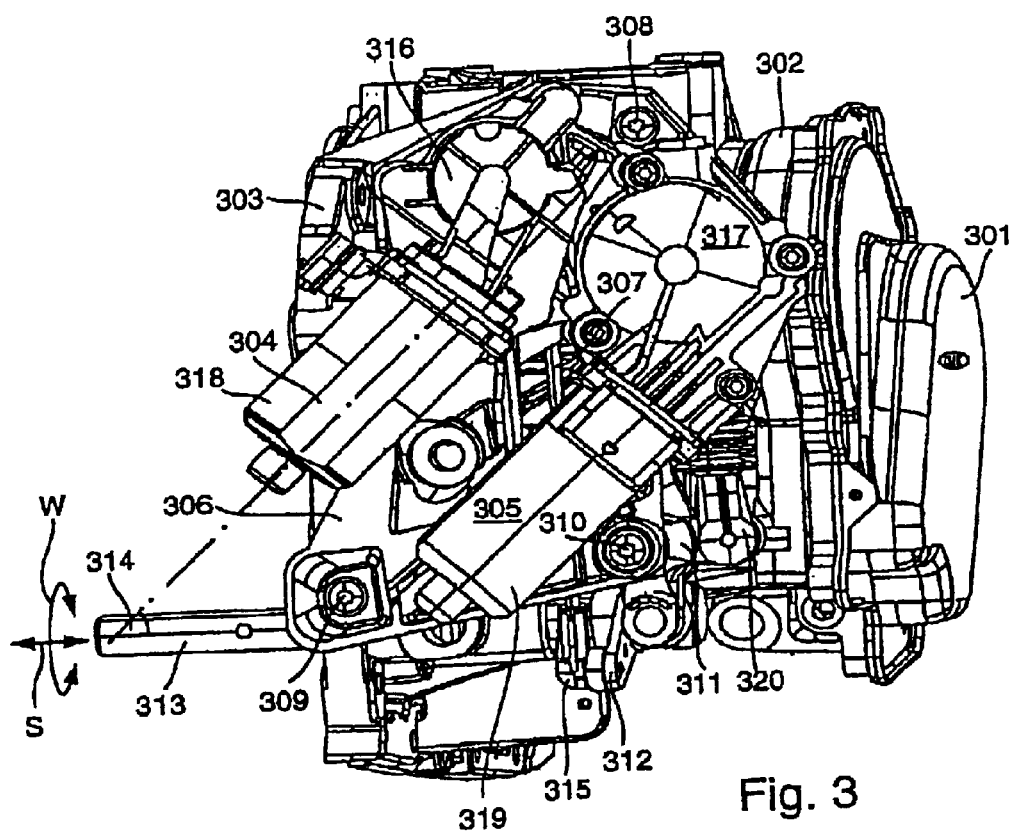
FIG. 3 is a perspective view of the transmission with the actuating means mounted on and/or in its case or housing.

FIG. 3 shows the transmission actuating means in the assembled condition. The transmission which mounts the actuating means comprises a composite housing or case including a primary section 303, an intermediate section 302 and a cover 301. A base plate 306 of the transmission actuating means is affixed to the composite housing or case by several threaded fasteners, e.g., by screws or bolts, of which three are shown at 308, 309 and 310. The fastener 310 further serves to tension a hollow cylindrical casing 311 for the shifting lever 312 of the transmission. FIG. 3 further shows a coupling rod 307 and the gear shifting shaft 313. The latter is shown in a horizontal position in front of and at the underside of the composite housing or case 301–303.

When it performs a gear shifting movement, the shaft 313 moves in the directions of a double-headed arrow S, i.e., it moves in a direction from the left to the right or vice versa. On the other hand, the arrow W shows the directions of angular movement of the shaft 313 about a horizontal axis in order to select a particular gear ratio for the transmission. The shifting lever 312 is operatively connected with the right-hand end portion of the shaft 313; this lever serves to initiate a shifting of the transmission (reference should be had again to the arrow S shown in the lower left-hand portion of FIG. 3) into a selected gear as well as to the arrow W which indicates the movements of the lever 312 in order to actually shift the transmission into a selected gear. The left-hand end portion of the gear shifting shaft 313 is operatively connected with shifting fingers and shifting forks (not shown) which, in turn, cooperate with the customary gear shifting sleeves or muffs of the change-speed transmission.

The transmission actuating assembly or means further includes the base plate 306, the gear or gear ratio selecting first drive 304 and the gear shifting second drive 305. In the view of FIG. 3, the drives 304, 305 are installed in front of the composite transmission case 301–303 in such a way that the parallel longitudinal axes of their respective motors (such as electric motors) 318, 319 make angles 314 of at least approximately 45° with the axis of the gear shifting shaft 313. Kinematic chains or trains are provided to establish motion transmitting connections between the drives 304, 305 and the gear shifting lever 312.

The axes of the gear selecting drive 304 and of the coupling rod 307 also make an angle which at least approximates 45°, i.e., the angle enclosed by the axes of the coupling rod 307 and the gear shifting shaft 313 equals or approximates 90°.

The axes of the coupling rod 307 (transmission of gear selecting movement) and of an element 320 for tension-free transmission of axial movement in connection with the shifting of the transmission into a selected gear are also at least substantially parallel to each other. Furthermore, the axes of the toothed rack and of the element 320 which cooperates with the toothed rack are at least substantially normal to the axis of the gear shifting shaft 313.

The mounting of the bearing 311 for the gear shifting lever 312 (whose axis coincides with that of the threaded fastener 310) is such that its axis is normal to the axis of the shaft 313 and is located in a plane at the level of the shifting lever 312. This ensures that a turning of the shifting lever 312 about the axis of the fastener 310 involves a gear selecting movement of the coupling rod 307 (see the double-headed arrow W in FIG. 3) but that an axial movement (arrow S) of the coupling rod 307 which is connected with the shifting lever 312 by way of a spherical (ball and socket) joint 315 leads to a turning of the shaft 313.

FIG. 3 shows the pole cups of the motors 318, 319 which respectively form part of the drives 304 and 305. These pole cups cooperate with the parts 316, 317 each of which has a casing open to one side of the first stage of the transmission. Such first stage can include a worm and a worm wheel. The drives 304 and 305 are connected with the transmission case section 303 (with the interposition of the base plate 306) in such a way that the open sides of the parts 316, 317 confront the transmission case.

The gear shifting drive 305 (i.e., the central movement transmitting part) is nearer to the shaft 313 than the gear selecting drive 304. Thus, the kinematic chain between the parts 305 and 313 is shorter than that between the parts 304 and 313; this is of advantage because the forces which are required to shift into a selected gear exceed the gear selecting forces.

An advantage of the arrangement of FIG. 3 is that it permits for a mounting of the motors 318, 319 in such a way that the motors are isolated from vibrations and/or oscillations of the combustion engine, of the transmission and from those attributable to operation of the vehicle.

Figure 4:
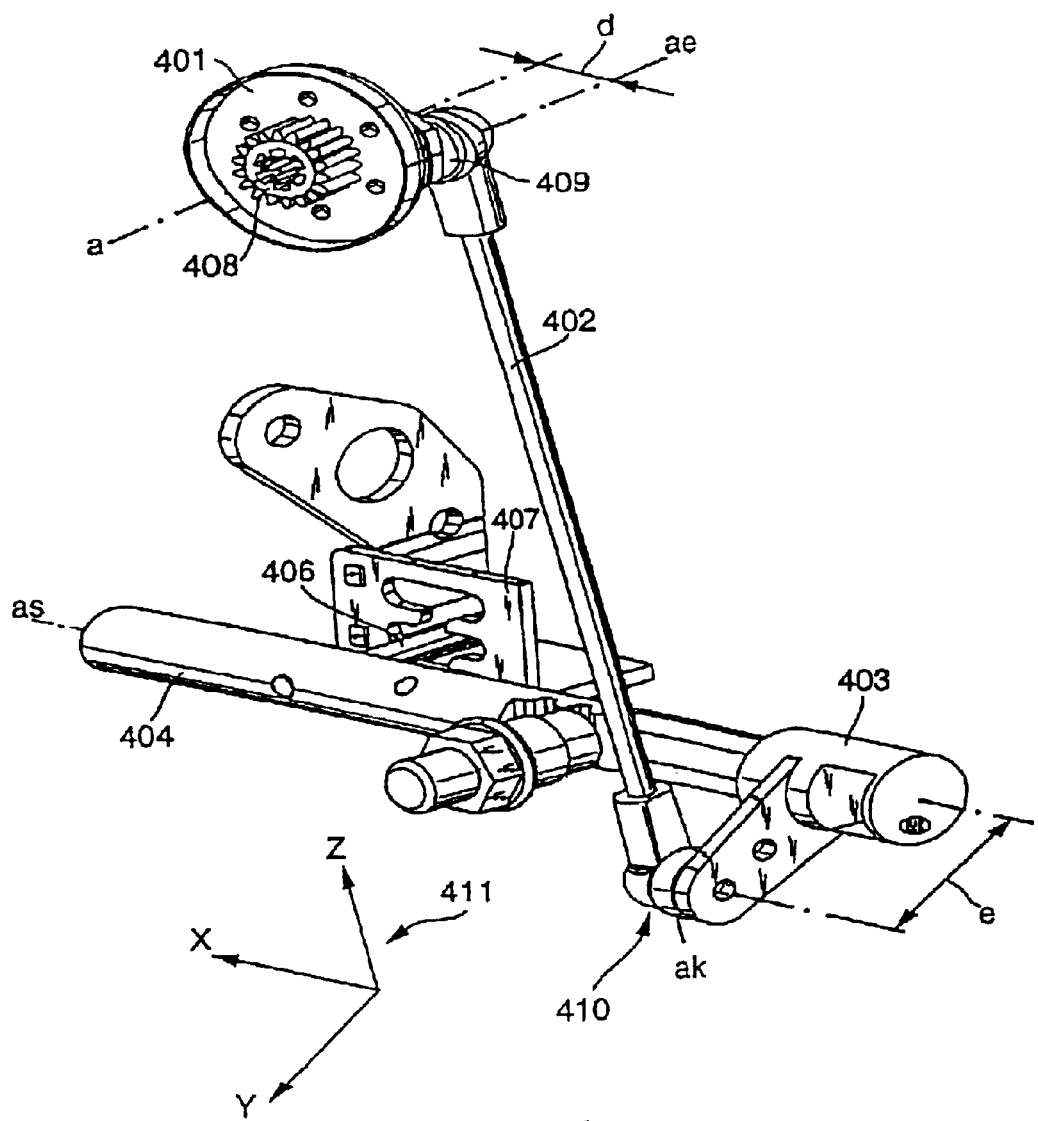
FIG. 4 is a perspective view of the kinematic chain or train of the gear selecting means for the transmission.

FIG. 4 illustrates the gear selecting kinematic train. The spur gear 408 is driven by a worm wheel (not shown in FIG. 4) and is connected to a disc 401 which carries an entraining member 409 having an axis which is offset (i.e., eccentric) relative to the axis of the worm wheel. The entraining member 409 forms part of a universal joint, such as a spherical joint, and can constitute a lever or an otherwise configured part which is capable of converting a rotary movement into an axial movement, namely a rotary movement of the disc 401 into an axial movement of a coupling rod 402. Such axial movement of the coupling rod 402 is transmitted, without stressing, to a selector arm 403 which is secured to the rotary shifting shaft 404; the transmission of such axial movement takes place by way of a connection which includes a universal joint 410, such as a spherical joint. A suitable coupling rod (denoted by the character 1501) is shown in and will be fully described with reference to FIG. 15.

The end positions of the gear selecting unit are determined by a mobile follower pin 406 which can be moved relative to and is guided by a gear shifting gate 407. The follower pin 406 is movable by the rotary shifting shaft 404 which receives motion from the respective drive (such as the drive 304 shown in FIG. 3) to thus select a desired gear ratio; this entails a movement of the follower pin 406 relative to the gear shifting gate 407 which latter also serves to determine the extent of the gear selecting movement and hence the positions of the paths for the follower pin 406.

The kinematics or kinematic train of the selector path constitutes a spatial four-bar mechanism. It is preferred to generate a minimal number of distortions.

In the embodiment of FIG. 4, the axis a of the worm wheel of the first transmission stage, the axis ak of the coupling rod 402 and the axis as of the shifting shaft 404 make angles of 90° in the course of a gear ratio selecting movement. In the Cartesian coordinate system 411 of FIG. 4, the y-axis is at least substantially parallel to the axis a of the worm wheel, the axis ak of the coupling rod 402 is at least substantially parallel to the z-axis, and the axis as of the shaft 404 is at least substantially parallel to the x-axis.

The shortest distance between the axes a and ak is determined by the distance d between the axis a of the worm wheel of the first transmission stage in the path of gear selecting movement and the axis ae of the eccentric entraining member 409. The shortest distance between the axes as and ak is determined by the effective length e of the selector arm 403.

Figure 16A:
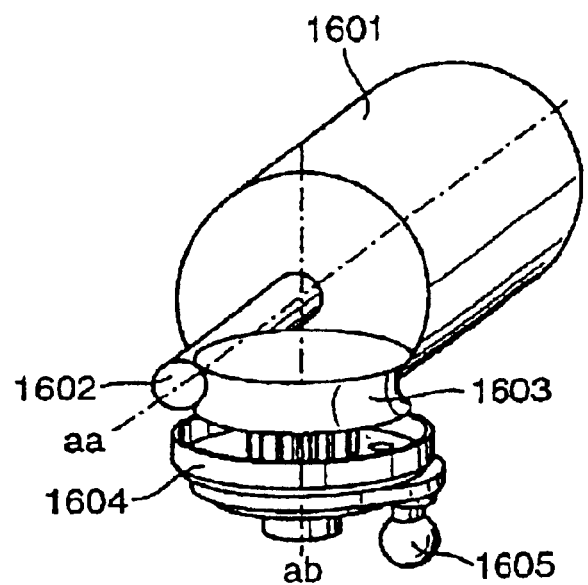
FIG. 16a is a perspective view of a motion transmitting connection between a drive and the gear selecting means of the transmission.

One presently preferred manner in which one of the drives (such as the drive 201 or 205 or the drive 304 or 305) can be connected to the gear selecting kinematics or kinematic chain is shown in FIG. 16a. The drive 1601 of FIG. 16a constitutes or includes an electric motor having a rotary output element which is arranged to rotate about the axis aa and to thus turn a worm wheel 1603 by way of a worm 1602. The worm wheel 1603 is connected with a disc-shaped entraining member 1604 which carries an eccentrically mounted spherical head 1605 arranged to be connected to the coupling rod 402 of FIG. 4. The other part of the universal joint including the spherical head 1605 can also be mounted on the disc-shaped entraining member 1604. The axis of the rotary disc-shaped entraining member 1604 is shown at ab.

FIG. 5 illustrates a presently preferred manner of transmitting gear shifting motion in the power train of the instant invention. The shaft 501 carries a spur gear 502 mating with a toothed rack 503 which is movable in the directions of its axis c. The connection between the toothed rack 503 and a pivotable gear shifting lever 506 includes an element 504 which is coaxial with the part 503 and is articulately connected with the lever 506 by a universal joint including a spherical head 505. A hollow cylindrical element 507 is provided to establish a pivot axis b for the shifting lever 506; this element 507 is affixed to the transmission case by a threaded fastener 508, such as a bolt or screw, which defines the pivot axis b.

The shifting lever 506 is designed in such a way that it prevents any, or any appreciable, distortions in the kinematics of the shifting movement which is required to shift the ratio of the change-speed transmission in the improved power train. Sinusoidal distortions invariably take place during conversion of an axial movement into a rotary movement or vice versa. Due to dual conversion by way of the gear shifting lever 506, the distortions of one set cancel (i.e., compensate for) the distortions of the other set so that the movement of the toothed rack 503 can be converted into a movement of the gear shifting shaft 511 in a highly advantageous manner.

A strain-free or jam-free connection between the gear shifting lever 506 and the gear shifting shaft 511 is established by way of the selector arm 509. The latter is coupled to the shaft 511 by a universal joint employing a spherical head connecting a crosshead with the selector arm 509 and being mounted in the selector arm.

A shifter detent 512 defines the neutral position resp. the positions of the selected and shifted-into gear ratios. The shoulders 510 of the shifting shaft 511 constitute internal abutments or stops of the transmission as seen in the gear shifting direction. The follower pin 513 on the shifting shaft 511 moves relative to the gear shifting gate 514 not only during the aforedescribed selection of particular gear ratios but also during actual shifting into the selected gears, i.e., the paths defined by the slots in the gate 514 guide the follower pin 513 during selection of a particular gear as well as during actual shifting into the selected gear.

The aforedescribed complete kinematic chain for the transmission of gear shifting movement has been found to allow for the transmission of gear shifting movement without or with minimal distortion of transmitted movements.

The conversion of an axial movement of the toothed rack 503 in the direction of the axis c into an axial movement of the shifting shaft 511 in the direction of the axis a which is at least substantially normal to the axis c takes place by way of the shifting lever 506 which is pivotable or rockable about the axis b, i.e., about an axis which is at least substantially normal to the axes a and c. The two legs 506a and 506b of the shifting lever 506 are of or can have identical lengths; this is desirable because such dimensioning reduces the likelihood of or prevents distortions during transmission of motion between the toothed rack 503 and the shifting shaft 511. However, if an intentional transmission- or power change is desired or necessary, it might be desirable to design the shifting lever 506 in such a way that the length of one of its arms 506a, 506b differs from the length of the other arm.

Furthermore, and as is the case in the power train embodying the structure of FIG. 5, if it is not desired or necessary to ensure a pronounced or substantial change of the transmission ratio, it is of advantage to generate an axial movement already with that transmission stage which includes or is constituted by the sprocket gear 502 and the toothed rack 503; the extent of such axial movement can correspond to that of the shifting shaft 511 in the shifting direction between the end positions, i.e., between the first and second gear ratios.

Figure 16B:
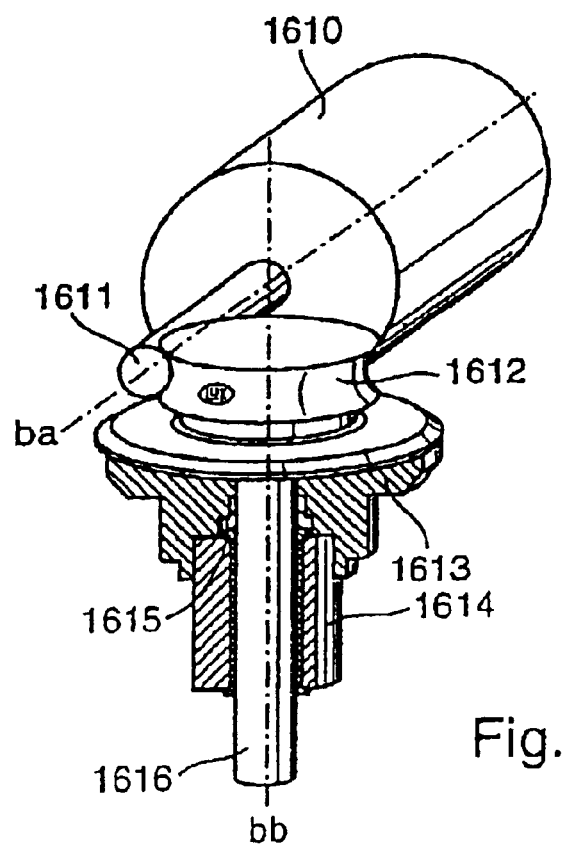
FIG. 16b is a partly perspective and partly sectional view of a motion transmitting connection between a drive and the gear shifting means of the transmission.

FIG. 16b illustrates a presently preferred mode of connecting the other drive 1610 (corresponding, for example, to the other drive 305 of FIG. 3) to the shifting kinematics or kinematic chain. This drive 1610 can include or constitute an electric motor having a rotary output element which constitutes or carries a coaxial worm 1611 mating with a worm wheel 1612 which is operatively connected with an elastic shifting component 1613. The component 1613 is provided with a recess or socket for a portion of a spur gear 1614. Thus, it can be said that the gear 1614 is plugged into the component 1613 and it surrounds a cylindrical bearing sleeve 1615 which, in turn, surrounds a shaft 1616 for the worm wheel 1612. The spur gear 1614 is rotatable relative to the shaft 1616.

The axis bb of the worm wheel 1603 (receiving torque from the worm 1602 driven by the electric motor of the drive 1601 shown in FIG. 16a) and the axis ba of the worm 1611 (driven by the electric motor of the drive 1610 shown in FIG. 16b) are at least substantially normal to the axes aa and bb of the worm wheel 1603 (FIG. 16a) and the worm wheel 1612 (FIG. 16b), respectively. The shortest distances between the axes aa and ab shown in FIG. 16a and the axes ba and bb shown in FIG. 16b are determined primarily or essentially by the radii of the respective worm wheels 1603 and 1612.

Figure 6A:
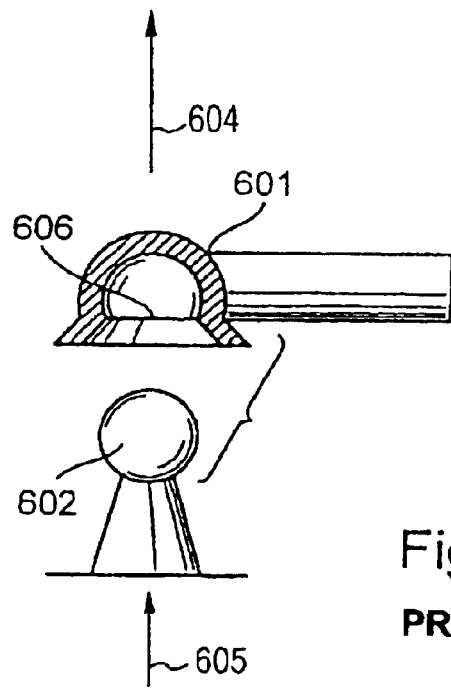
FIG. 6a is an exploded partly sectional view of a universal joint which can be utilized in the power train embodying the improved gear selecting and gear shifting means for the transmission.

FIG. 6a illustrates a conventional universal joint including a spherical socket 601, which can be made of a suitable plastic material, and a spherical head 602. The arrow 605 indicates the direction of introduction of the spherical head 602 into the complementary cavity of the socket 601. The diameter of the collar 606 at the inlet of the cavity in the socket 601 is slightly less than the diameter of the spherical head 602 so that the latter can be held in the socket against unintentional extraction except when the magnitude of the force acting upon the head 602 in a direction counter to that indicated by the arrow 605 or of a force acting upon the socket 601 in the direction of arrow 604 exceeds a predetermined value. The elasticity of the head 602 and/or of the socket 601 should be sufficient to ensure that at least one of these parts undergoes requisite deformation when the head is to enter into or is to be extracted from the socket. The magnitude of the force which is required to take the universal joint of FIG. 6a apart can be varied within a relatively wide range by appropriate selection of the elasticity of the material of the socket 601 and/or head 602 and/or by appropriate selection of the diameter of the collar 606 (in comparison with the diameter of the head 602).

As a rule, the joint of FIG. 6a transmits forces which are normal or substantially normal to that indicated by the arrow 604 or 605. If the joint is to transmit force from the head 602 to the socket 601 in the direction of arrow 605, the magnitude of the force tending to separate the head from the socket is zero, i.e., the diameter of the collar 606 can almost equal the diameter of the head 602. On the other hand, the joint of FIG. 6a is not suited for the transmission of pronounced forces acting upon the socket 601 in the direction of arrow 604, i.e., of forces which tend to separate the parts 601, 602 from each other.

Figure 6B:
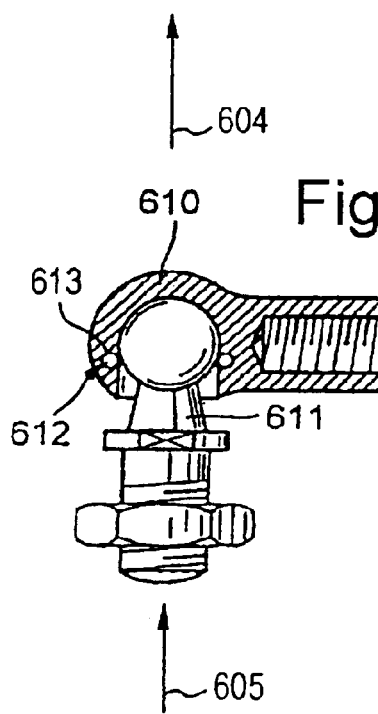
FIG. 6b is a partly elevational and partly sectional view of a modified universal joint which is designed to transmit pronounced pushing as well as pulling forces between its spherical head and its hollow spherical socket.
Figure 6B:
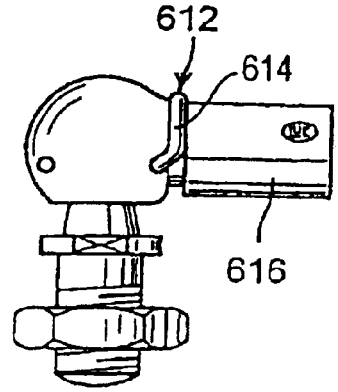
Figure 6C:
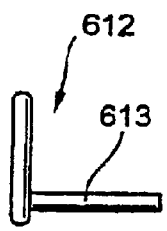
FIG. 6c is an elevational view of a retaining element which is utilized in the joint of FIGS. 6b and 6bb.
Figure 6C:
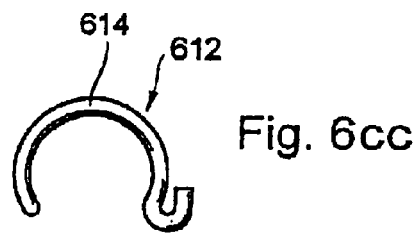

FIGS. 6b and 6bb show a modified universal joint which can be put to use when the spherical head 611 is to be held in the complementary recess of the socket 610 with a relatively large force, i.e., if the socket 610 can be subjected to the action of a relatively large force acting in the direction of the arrow 604 and tending to separate it from the head 611. To this end, the joint comprises an additional component 612 which is a metallic element having an arcuate portion 613 (see FIG. 6c) which replaces the collar 606 of FIG. 6a and a yoke-like second portion 614 (refer to FIG. 6cc) which surrounds the socket 610 at one side of the head 611. It is often sufficient to employ only the portion 613.

The socket 610 of FIG. 6b need not be provided with a collar 606 of the type shown in FIG. 6a; therefore, this socket 610 need not be made of a resilient material. The yoke-like portion 614 engages the socket 610 of FIGS. 6b and 6bb at one end of a cylindrical or tubular extension 616 which secures this socket to a motion transmitting or to a motion receiving part of the transmission or another part of the power train in which the universal joint of FIGS. 6b, 6bb and 6c, 6cc is used. A radially outer portion of the part 613 is recessed into the socket 610 and the radially inner portion of the part 613 extends into the adjacent portion of the cavity in the socket 610 to replace the internal shoulder 606 of FIG. 6a, i.e., to engage a portion of the spherical external surface of the head 611 in the fully assembled condition of the universal joint of FIGS. 6b, 6bb, 6c, 6cc. The yoke-like portion 614 assists the portion 613 in withstanding forces which act in the direction of the arrow 604, i.e., forces which tend to separate the constituents 610, 611 of the universal joint shown in FIGS. 6b and 6bb. The part 613 also resists forces which tend to extract the spherical head 611 from the complementary socket 610.

Figure 6D:
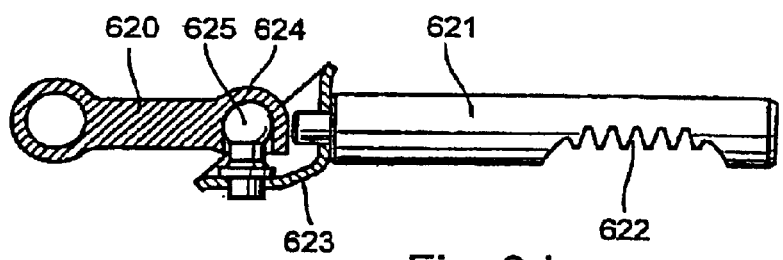
FIG. 6d is a partly elevational and partly sectional view of a further universal joint which can be utilized between relatively movable parts in a power train embodying the improved transmission.

If a universal joint (e.g., a joint of the type shown in FIG. 6a or 6b or an analogous joint) is to establish an articulate connection between two elongated parts, one can proceed in a manner as shown in FIG. 6d. This Figure shows two elongated at least partly cylindrical members or elements 620, 621 and a spherical universal joint between them. One end portion of the elongated element 620 is provided with a spherical socket 624 which receives the spherical head 625 forming part of or connected to the adjacent elongated element 621 constituting or including a toothed rack having a series or row of teeth 622. The reference character 623 denotes in FIG. 6d a carrier which is borne by the elongated element 621 and carries the spherical head 625. The carrier 623 can constitute an integral part of the left-hand end portion of the toothed rack 621 and/or the spherical head 625 can be made of one piece with the carrier 623. It has been ascertained that the structure of FIG. 6d is simpler, less expensive and more compact than presently known and/or utilized assemblies which serve to couple two elements in such a way that at least one thereof can perform multidirectional (such as an infinte number of) movements relative to the other element.

The parts which are shown in FIGS. 6a, 6b, 6bb, 6c, 6cc and 6d can be made of suitable metallic and/or plastic materials. The selection of such materials depends upon the intended use of the elements and/or upon the anticipated magnitude of forces which are to be applied to such elements and to the joint or joints between them.

Figure 7A:
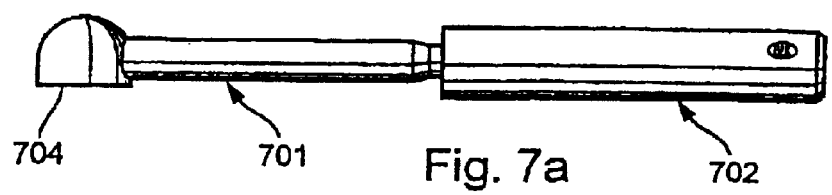
FIG. 7a is an elevational view of a further universal joint.
Figure 7B:
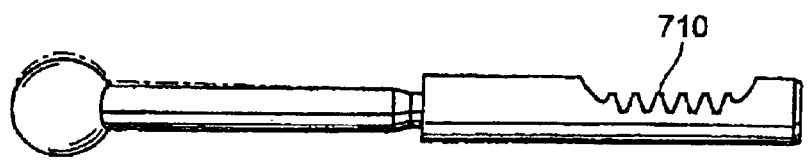
Figure 7C:
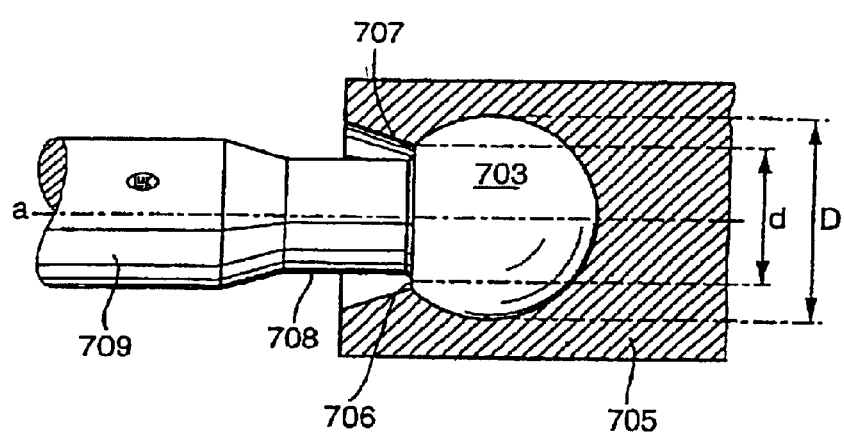
FIG. 7c is a fragmentary partly elevational and partly sectional view of a further universal joint.

If a force is to be transmitted between elements where the direction of connection is the same as the working direction, it is of particular advantage—in accordance with the present invention—to proceed in a manner as shown in FIGS. 7a, 7b and 7c. The embodiment which is shown in these Figures is particularly suitable for the establishment of a non-rigid (movable) connection between two elongated (for example, cylindrical) elements which are stressed in the longitudinal (axial) direction.

FIGS. 7a and 7b show a toothed rack 702 which is articulately connected with a rod-like pusher 701. The rack 702 has a row of teeth 710 which can mate with the teeth of a spur gear or with another suitable force transmitting device, and the pusher 701 can transmit motion to one or more parts by way of a spherical socket 704 provided at that end thereof which is remote from the toothed rack 702.

The connection between the elements 701, 702 preferably includes a spherical socket 705 (see FIG. 7c) which is or which can be made of a thermally deformable material, particularly a material which can be shaped in a casting or injection molding machine. Examples of suitable plastic materials which can be utilized for the making of the socket 705 are those known as PA 6.6-GF 30 and POM-GF 30. The socket 705 receives a spherical head 703 which is preferably made of steel or another material having a higher melting point than that of the material of the socket. The arrangement can be such that the material of the head 703 is poured into the cavity of the socket 705 or that the material of the socket is poured into a mold forming part of an injection molding machine and containing the already finished head.

It is equally within the purview of the present invention to make the socket 705 of a material having a melting point which is higher than that of the material of the spherical head 703. In either event, it is advisable to make the part consisting of a material having a higher melting point prior to the making of the other part and to thereupon make the other part simultaneously with the establishment of articulate connection between the two parts.

Still further, it is possible to make the parts 703, 705 of materials having identical or practically or substantially identical melting points.

It is further advisable to carry out all necessary and/or special undertakings which are required to secure that the parts 703, 705 can move relative to each other to a required extent and within the full range of temperatures which are expected to arise in actual use of the power train embodying one or more joints of the type shown in FIGS. 7a to 7c. This can involve the utilization of a separating agent, such as wax, and/or resort to a special cooling treatment and/or another special undertaking and/or material and/or part or parts. Such procedure is or can be equally desirable or even indispensble if the parts 703 and 705 consist of materials having different melting points.

As shown in FIG. 7c, the socket 705 is provided with a ring-shaped collar 706 having a diameter d which is much less than the diameter D of the spherical head 703 and of the spherical head-receiving cavity in the socket. This ensures reliable retention of the head 703 in the socket 705, even if these parts are being acted upon by forces which tend to extract the head from the cavity of the socket, e.g., if the element 709 which is secured to the head is being pulled away from the socket in the direction of its axis a. The ratio D to d can be within the range of between 1.1 and 2, preferably at least close to 1.43. This ratio (D/d) should be higher if the axial stress upon the part 709 in a direction to extract the head 703 from the cavity of the socket 705 is higher. In fact, it is not excluded that one must select a ratio D/d which is above 2.

The collar 706 of the socket 705 is disposed between the spherical cavity for the head 703 and a funnel-shaped inlet 707 which tapers toward the axis a in a direction away from the element 709. The latter includes a cylindrical shank 708 which carries the spherical head 703. The diameter of the shank 708 and the slope of the surface bounding the funnel-shaped inlet 707 determine the extent to which the parts 705, 709 can pivot relative to each other, i.e., the extent to which the axis a can be inclined relative to the longitudinal axis of the socket 705. The surface bounding the funnel-shaped inlet 707 determines the maximum extent of pivotability of the parts 705, 709 relative to each other, i.e., the arrangement can be such that the part 709 can swivel relative to the part 705 and/or vice versa to an extent which is necessary to move the shank 708 into actual abutment with the surface bounding the funnel-shaped inlet 707.

Figure 19:
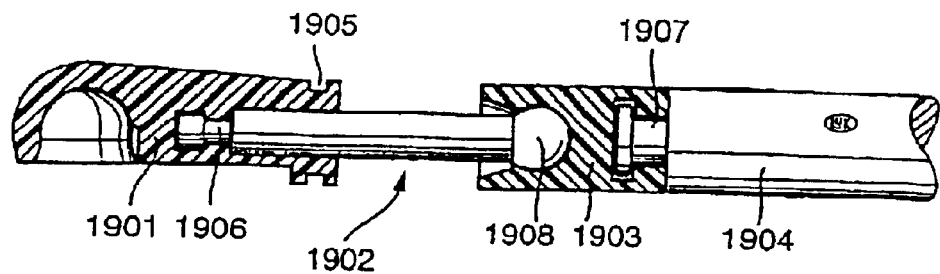
FIG. 19 is a fragmentary partly elevational and partly sectional view of a universal joint between a rod and a toothed rack which can be utilized in conjunction with the improved transmission.

Referring now to FIG. 19, there is shown a modified universal (swivel) joint between an elongated toothed rack 1904 and an elongated push rod 1902. At least that portion of the rack 1904 which is provided with a row of teeth (not shown) is made of a metallic material. In the embodiment of FIG. 19, the rack 1904 comprises a toothed metallic part and a plastic part 1903 which is a casting surrounding a substantially T-shaped (undercut) extension 1907 of the metallic part. The push rod 1902 has a spherical metallic head 1908 which can swivel relative to but is anchored in the plastic part 1903, preferably simultaneously with confinement of the extension 1907 in the part 1903. Such spherical joint can stand pronounced stresses including those which tend to extract the extension 1907 from the plastic part 1903 and/or those which tend to extract the spherical head 1908 of the push rod 1902 from the part 1903.

That end portion of the metallic push rod 1902 which is remote from the spherical head 1908 has an undercut 1906 which is embedded in a plastic part 1901. The part 1901 can but need not be made (e.g., in a casting or injection molding machine) simultaneously with the part 1903 and can serve to couple the push rod 1902 with a shifting lever in the aforedescribed power train. Still further, the part 1901 is provided with a groove 1905 to receive a portion of a bellows which is to shield the universal joint of FIG. 19 or at least a part thereof from contamination; the groove 1905 is provided in that portion of the part 1901 which is near or nearest to the head 1908.

The undercut (T-shaped) portions 1906 and 1907 constitute but one form of means for reliably coupling the casting 1901 to the push rod 1902 and the casting 1903 to the toothed rack 1904; many other types of anchoring means can be utilized with equal or similar advantage.

Figure 8:
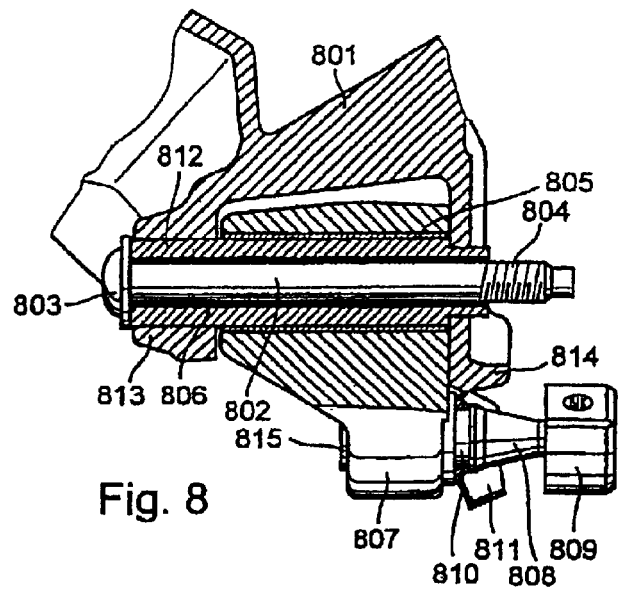
FIG. 8 is a partly elevational and partly sectional view of a connection between a base plate for the drives of the transmission gear selecting and shifting means and the case of the transmission as well as of one presently preferred mounting of a shifting lever forming part of the mechanism which shifts the transmission into a selected gear.

FIG. 8 illustrates the manner in which a hollow cylindrical element 812 is mounted in the base plate 801 which, in turn, is secured to the composite or one-piece case or housing of a change-speed transmission. FIG. 8 further shows the manner of mounting a turnable shifting lever 807 which is borne by the element 812. That portion of the base plate 801 which confines or seats the hollow cylindrical element 812 is shaped as a fork having two tines or legs 813, 814. The leg 813 is provided with a through hole or bore having a diameter matching or closely approximating the diameter D of the major portion 1405 of the hollow cylindrical element 1401 shown in FIG. 14, and the leg 814 is provided with a through hole or bore having a diameter corresponding to that (d) of the remaining portion 1404 of the element 1401. A radial abutment or shoulder 1403 is provided between the two portions 1404, 1405 of the hollow cylindrical element 1401 of FIG. 14. When the element 1401 is properly installed in the base plate 801 of FIG. 8, the shoulder 1403 abuts the inner side of the leg 814 and a threaded fastener 802 is or can be employed to extend through the axial bore or hole 1406 of the element 1401 and to thus secure the base plate 801 to the case of the transmission. The head 803 of the fastener 802 then bears upon the end face 1402 of the element 1401 to exert a tensioning force while the external thread 804 of the fastener extends into a tapped bore (not shown) of the transmission case.

Figure 14:
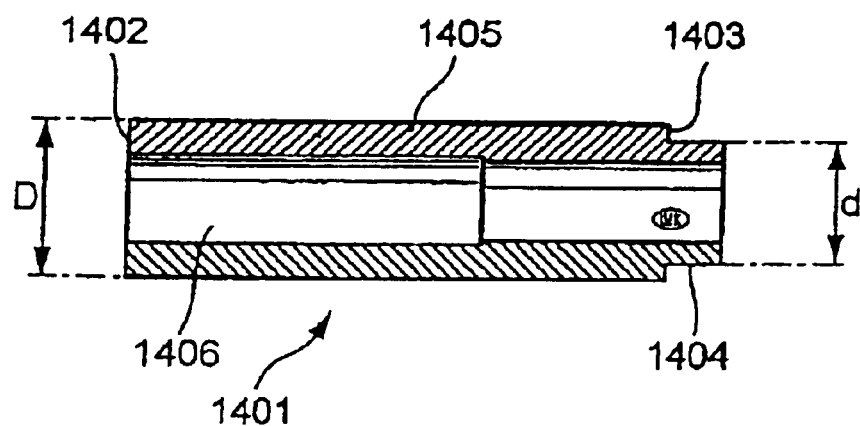
FIG. 14 is an axial sectional view of a part which can be utilized to secure the base plate for the gear shifting and selecting drives on the transmission case and to simultaneously mount the shifting lever.

The hollow cylindrical element 812 of FIG. 8 corresponds essentially to the element 1401 of FIG. 14; it comprises a relatively long larger-diameter cylindrical section and a relatively short smaller-diameter cylindrical section as well as an axial bore or hole for the elongated threaded fastener 802. The exposed end face of the smaller-diameter short cylindrical section of the element 802 abuts the transmission case which is not shown in FIG. 8 or 14.

The length of the threaded fastener 802 preferably greatly exceeds its diameter; this is of particular advantage for proper taking up of dynamic stresses because the fastener 802 can act as a variable-length component. For example, the ratio of the length to the diameter of the fastener 802 can be 10:1 or thereabout.

It is further desirable to mount the threaded fastener 802 in such a way that it is highly unlikely to become accidentally separated from the transmission case and/or from the base plate 801 and to become misplaced in the power train of the motor vehicle, during storage of the transmission or during transport toward the assembly plant. For example, the fastener 802 can be installed in the hollow cylindrical element 812 or 1401 before the latter is installed in the base plate 801. Such mounting of the fastener 802 against accidental separation from the base plate 801 can include resort to one or more parts which facilitate rapid and convenient mounting of the base plate 801 and fastener 802 in desired or required positions relative to each other, which can be loosened or removed to permit for adjustment of the fastener 802 relative to the base plate 801 and/or vice versa, which can be reapplied to hold the components 801, 802 in desired (newly selected or initially selected) positions with reference to one another, which can invariably maintain the components 801, 802 in the selected axial and/or other positions with reference to each other, and which can also maintain one or more additional parts in optimal positions relative to each other, relative to the base plate 801 and/or relative to the transmission case.

As already mentioned hereinbefore, the fastener 802 can be installed in the hollow cylindrical element 812 before the latter is assembled with one or more other parts; this ensures that the fastener 802 and the element 812 can be treated as a unit during subsequent assembly of the transmission as well as during mounting of the transmission in the power train of a motor vehicle. This can involve the assembly of a unit having numerous parts such as the base plate 801, the drives (such as 304 and 305), kinematic elements (such as levers, rods, toothed racks and/or others) and/or other individual parts of preassembled groups of two or more parts. The fastener 802 remains coupled to at least one part (such as the element 812) without risking its misplacement, misconnection and/or other undesirable occurrences which could affect the desired or prescribed mode of assembly of the transmission, of the transmission actuating means and/or of the power train.

The likelihood of losing or misplacing the fastener 802 or an equivalent thereof is greatly reduced by resorting to a sleeve 806 which can be made of a foamed plastic material and surrounds the fastener. This sleeve is or can be dimensioned in such a way that it holds the fastener 802 against undesired and/or unnecessary axial and/or angular movements relative to the hollow cylindrical element 812; to this end, the sleeve 806 can be more or less permanently applied to the external surface of the fastener 802 or to the internal surface of the element 812. Alternatively, the sleeve 806 can constitute a prefabricated part which is made of rubber or a suitable synthetic plastic material and is dimensoned to ensure reliable frictional engagement with the fastener 802 as well as with the hollow cylindrical element 812. Still further, the element 806 can constitute a one-piece sleeve or a composite cylindrical sleeve consisting of two or more shorter sleeves disposed end-to-end and preferably having identical sizes and/or shapes and/or being made of identical materials (e.g., to thus achieve savings in connection with the making and/or installation of such parts on the fastener 802 and/or in the element 812 of FIG. 8).

FIG. 8 further shows a cylindrical bearing sleeve 805 (e.g., a sleeve made of a metallic material) which is interposed between the peripheral surface of the hollow cylindrical element 812 and the adjacent internal surface of the turnable shifting lever 807. The sleeve 805 extends between the legs 813 and 814 of the base plate 801.

The shifting lever 807 is provided with means for connecting it to the aforediscussed selector arm of the change-speed transmission. To this end, the lever 807 carries a partly conical pin or post 808 for a spherical head forming part of a universal joint further including a plastic socket 809 receiving the spherical head at the right-hand end of the pin or post 808. The connection between the spherical head on the pin or post 808 and the socket of the crosshead 809 can be established in any one of the aforedescribed manners. The crosshead 809 is mounted in the selector arm of the transmission in one of the aforedescribed manners to ensure the transmission of forces without jamming, blocking, excessive friction or the like.

The pin or post 808 is further provided with an annular groove 810 for reception of a portion of a bellows 811 or other suitable means for reducing the likelihood of contamination with dust or the like. This bellows can surround one or more adjacent parts which is or are sensitive to contamination with foreign particles including solids and/or droplets of a liquid substance.

The pin or post 808 of FIG. 8 has an enlarged (such as flattened) left-hand end portion 815 which acts not unlike the head of a rivet and maintains the post and the parts which are coupled to the post against any or against excessive axial movements relative to the shifting lever 807.

The post 808 can be made of a hard or a hardened material to thus ensure that it can stand extensive wear for long periods of time. The end portion 815 of this post can be flattened or otherwise enlarged by resorting to wobbling or another suitable technique and the axis of the post is or can be parallel to the pivot axis of the shifting lever 807 (i.e., to the axis of the fastener 802).

The other arm of the normally two-armed shifting lever 807 is not shown in FIG. 8; such other arm can also carry a spherical head or a spherical socket constituting a component part of a universal joint which movably couples the lever 807 with a part or group of parts serving to transmit motion to and/or to receive motion from the lever.

Figure 9:
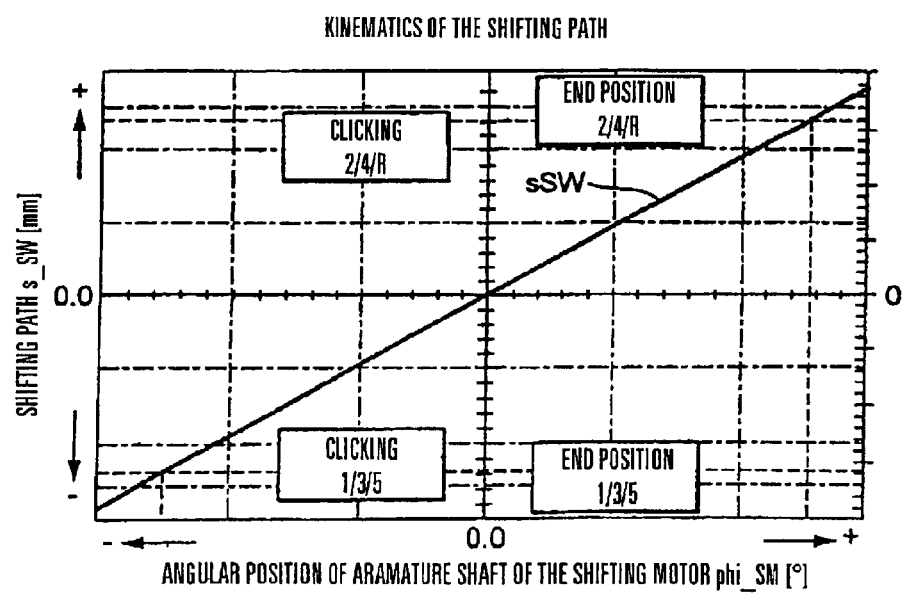
FIG. 9 is a coordinate system pertaining to the kinematic chain of the gear shifting path.

The coordinate system of FIG. 9 is representative of the kinematics of the shifting path. The shifting path s_SW (in millimeters) is measured along the ordinate, and the extent of angular movement phi_SM[°] of the armature shaft of the shifting motor is measured along the abscissa. The shifting path undergoes a linear change, in response to rotation of the armature shaft of the shifting motor, in such a way that the extent of rotation of the armature shaft suffices to readily shift between the end positions of the first, third and fifth speeds on the one hand, and the second and fourth speeds and reverse speed on the other hand. The transmission with a shifting path as shown in FIG. 9 is assumed to be shiftable into five forward gears (1 to 5), a neutral gear and a reverse gear (R).

Figure 10:
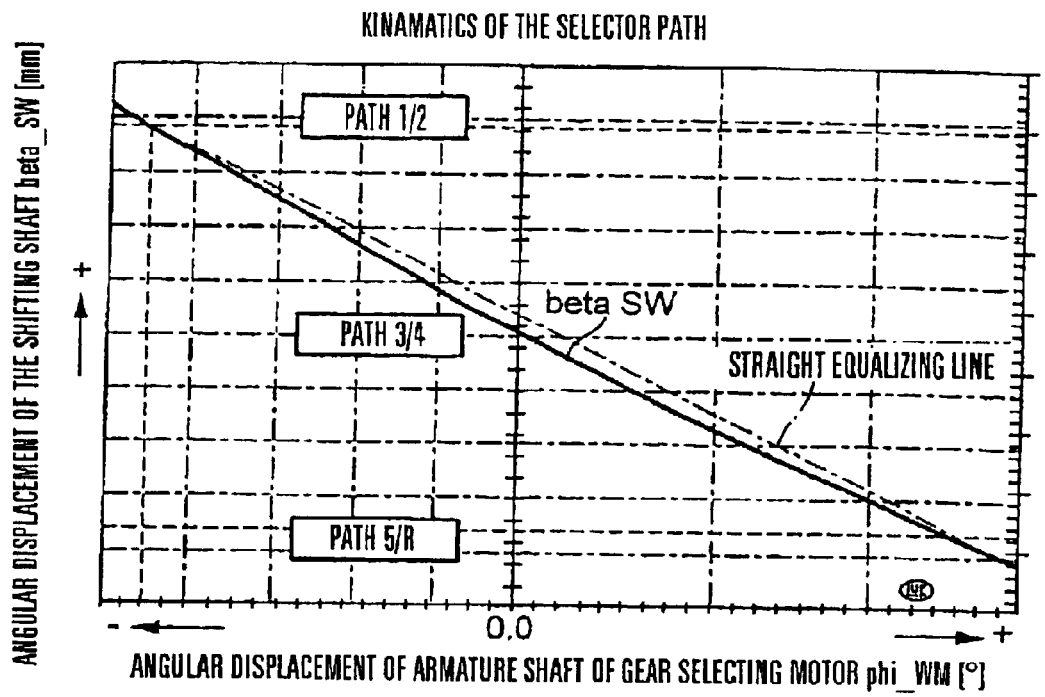
FIG. 10 is a similar coordinate system but pertaining to the gear selecting path.

FIG. 10 shows a coordinate system wherein the curves are representative of the kinematics of the selector path. The angular displacement beta_SW[mm] of the shifting shaft is measured along the ordinate, and the angular displacement phi_WM[°] of the armature shaft of the selector motor is measured along the abscissa. The conversion of angular movement of the rotor of the selector motor is carried out in such a way that the available range of angular movements suffices to readily shift between the shifting paths 1/2, 3/4 and 5/R.

Figure 11:
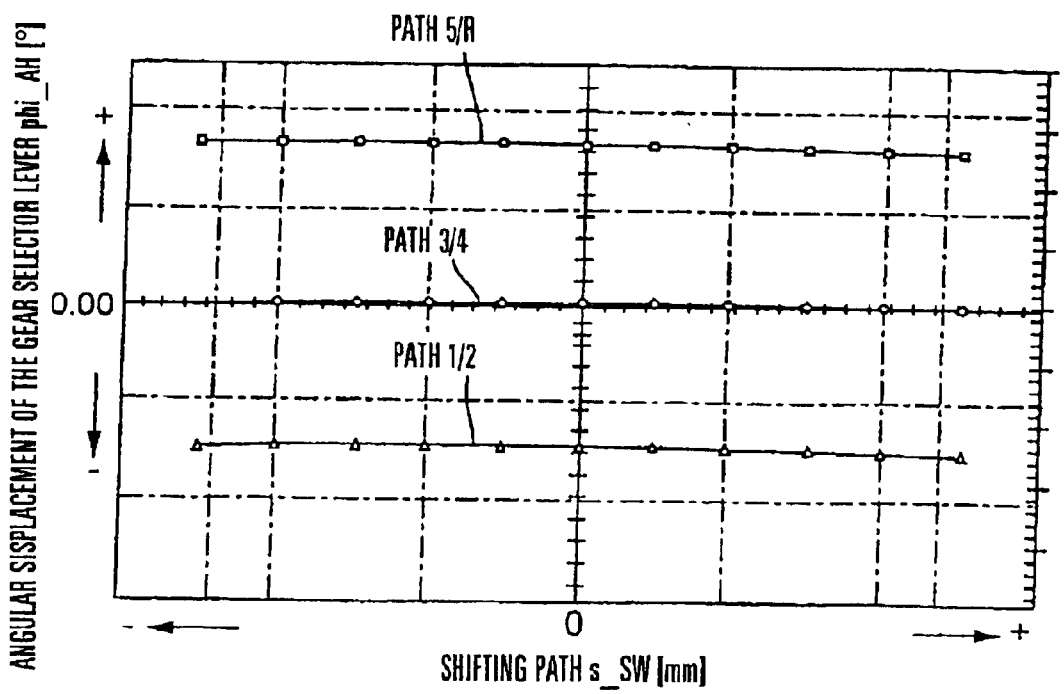
FIG. 11 is a coordinate system illustrating the effects of gear shifting movements upon the selection kinematics.

FIG. 11 shows a coordinate system wherein the angular displacements (angle phi_AH[°]) of the gear selector lever are measured along the ordinate and the shifting path s_SW[mm] is measured along the abscissa. The curves denote the influence of shifting movement. Due to the utilization of the selector arm to carry out the selector movements as well as the shifting movements, a shifting movement invariably entails a change of the selector movement. FIG. 11 illustrates the manner in which the extent of angular movement phi_AH[°] of the selector lever for the shifting paths 1/2, 3/4 and 5/R changes in response to changes of the shifting movement s_SW.

In order to monitor and ascertain various positions within the drives, there is provided an incremental sensor system which is operated as follows: If the processing of the signals furnished by the sensors to the control unit results in a determination that the positions of certain parts depart from the desired or required or optimum positions, the control system initiates an adjustment of the drives. The threshold at which the adjustment is initiated depends upon the selected regulating hysteresis of the control unit and the clearances or plays which are selected in the kinematic chain.

It is preferred to ensure that the maximal departure of the angle of turning the selector lever in response to a shifting movement is less than the sum of clearances or plays in the selector chain. In this manner, one prevents a recognition or detection of departure of the sensors, which are installed in and/or associated with the drives, and hence the initiation of a follow-up regulation.

The kinematics of the selector path as well as of the shifting path are designed or set up in such a way that the influence of shifting movement upon the selected position is as small as possible.

Figures 12, 12A, 12B:
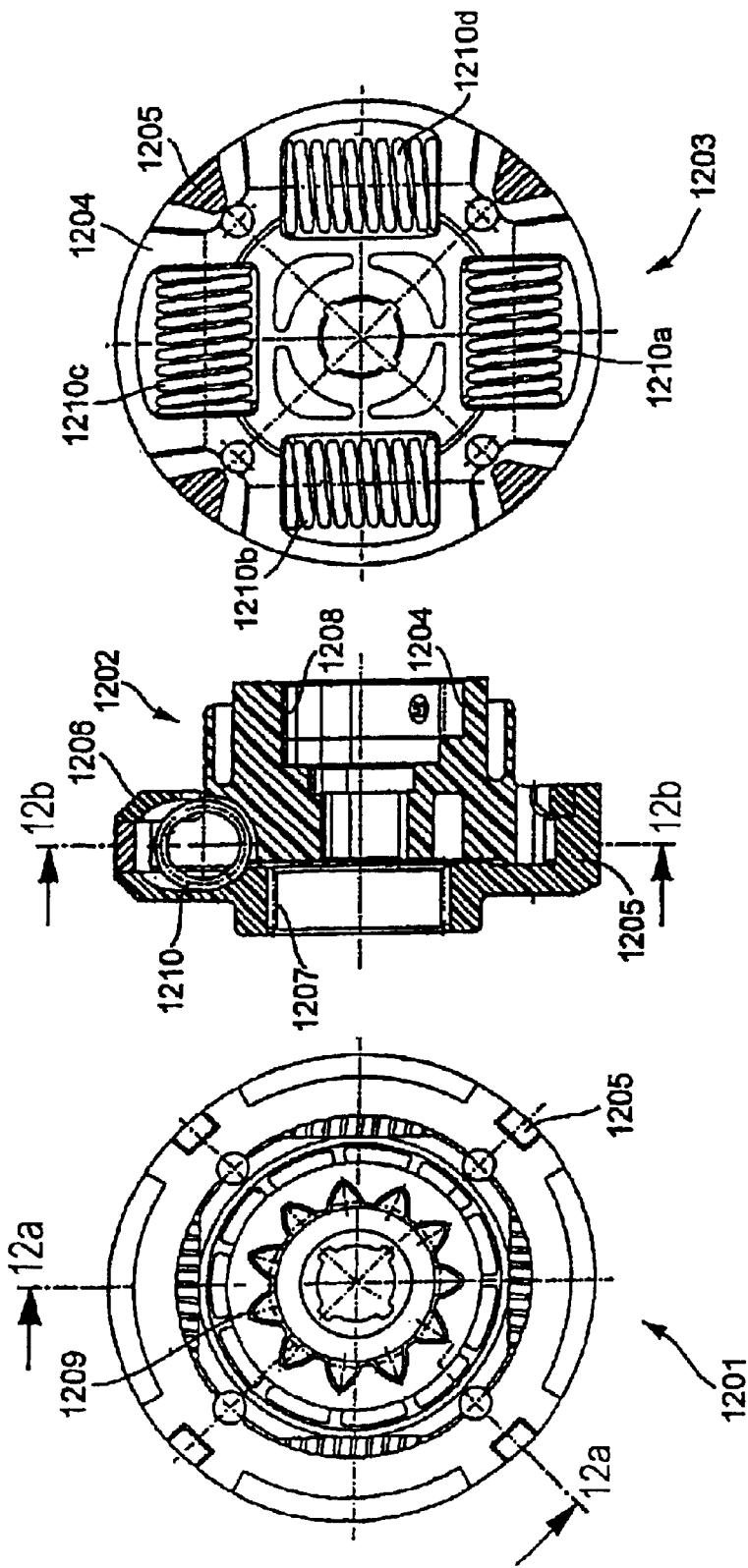

FIGS. 12, 12a and 12b illustrate the assembly of elements which constitute the resilient arrangement for the selection of desired gears or gear ratios of the transmission. The resilient arrangement is constituted by or includes two partial elements 1204, 1205 which have a certain limited freedom of angular movement relative to each other. These elements are elastically and dampingly coupled to one another, one (such as 1205) of these elements has internal teeth 1207 in force- and form-locking engagement with the teeth of the worm wheel 1612 of FIG. 16b, and the other (1204) of these elements has internal teeth 1208 mating with the teeth of the spur gear 1614 of FIG. 16b. The springs and dampers of the resilient arrangement of FIGS. 12, 12a and 12b preferably exhibit characteristic curves such that the driving arrangement is effective in accordance with the kinematics and the undertakings of the clutch, for example, that the drive is isolated from abrupt changes of force which are caused by shifting of the transmission into different gears.

FIG. 12b shows a resilient arrangement 1210 (FIG. 12a) with four resilient elements in the form of coil springs 1210a, 1210b, 1210c and 1210d which are connected in parallel, i.e., the stiffnesses of which are superimposed upon (added to) each other.

In order to achieve a desired overall characteristic curve, it might be of advantage to employ springs having identical characteristic curves. In accordance with a modification, one can select springs having different characteristic curves. Each spring can have a linear characteristic curve. However, if necessary, one can employ with advantage springs having progressive or degressive characteristic curves. In the embodiment of FIGS. 12, 12a and 12b, the damping takes place linearly; in accordance with a modification, the damping can vary as a function of distance- and/or frequency changes.

FIG. 12 shows the resilient arrangement in a plan view 1201; FIG. 12a shows the resilient arrangement in a sectional view 1202 as seen in the direction of arrows from the line 12a—12a in FIG. 12; and FIG. 12b shows the resilient arrangement in a sectional view 1203 as seen in the direction of arrows from the line 12b—12b in FIG. 12a. The structure of FIGS. 12, 12a and 12b receives torque from a toothed member which has teeth mating with the teeth 1207 in the input element 1205. The latter transmits torque to the output element 1204 by way of the coil springs 1210a to 1210d, and the element 1204 transmits torque to a part having teeth mating with the teeth 1208. The teeth of the gear 1209 shown in FIG. 12 can mate with the teeth 1208.

Alternatively, the internal teeth 1208 can be omitted if the gear 1209 is rigidly (non-rotatably) secured to the part 1204. The input element 1205 is or can be rigidly connected with a ring-shaped element 1206.

Figure 13:
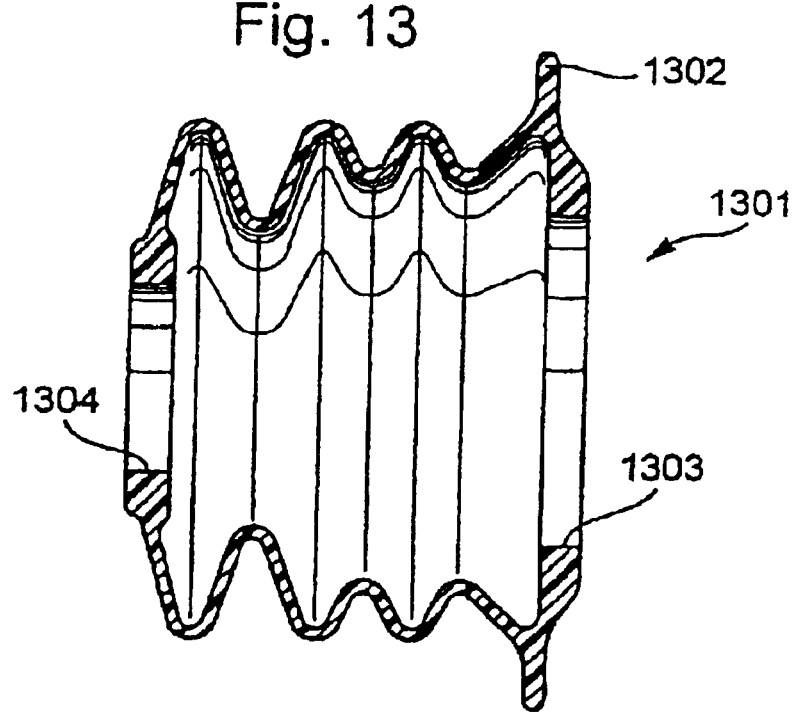
FIG. 13 is a sectional view of a bellows which can be utilized in the structure of FIG. 2 or 3.

FIG. 13 shows a bellows 1301 which can be put to use to shield from contamination a selected (such as the first) stage of the change-speed transmission. One end portion 1304 of the bellows 1301 is receivable in a groove of a pusher (such as the part 701 in FIG. 7a) which is or can be connected with a toothed rack (see the part 702 in FIG. 7a). The other end portion 1303 of the bellows 1301 can be received in a groove of the base plate (such as the base plate 306 shown in FIG. 3). The larger-diameter portion 1302 adjacent the end portion 1303 of the bellows 1301 is provided to facilitate mounting of the bellows in the transmission of or elsewhere in the power train.

FIGS. 15, 15a and 15b show an element which serves to transmit axial movements in the path for the transmission of gear selecting movement. Though it is suited for the transmission of axial movements, this element is articulately mounted in the transfer path. Such mounting is possible in that at least one end portion of the element is provided with a universal (such as spherical) joint.

The movement transmitting element of FIGS. 15, 15a and 15b includes a rod or shaft 1501 and two parts 1502, 1503 which are castings applied to the end portions of the rod 1501. As shown in the sectional view 1504 of FIG. 15b, the part 1503 includes a socket having a part-spherical cavity for a spherical head (not shown) on a part which receives motion from and/or transmits motion to the rod 1501. The manner in which the part 1502 and/or 1503 is applied to the respective (grooved) end portion of the rod 1501 is or can be the same as already described, for example, with reference to FIGS. 6a, 6b, 6d and 7c.

It is clear that the part 1503 can be replaced with a part exhibiting a spherical head to be installed in a socket of that member (e.g., a toothed rack) which receives motion from and/or transmits motion to the rod 1501. Still further, it is within the purview of the present invention to replace the part 1503 with a part which is of one piece with the rod 1501 and is provided with a socket or with a spherical head.

The part 1502 is or can be identical with the part 1503 and is angularly offset relative thereto. However, it is also possible to connect the parts 1502, 1503 with the rod 1501 in such a way that their angular positions are identical, i.e., that the open side of the spherical socket in the part 1502 faces in the same direction as the open side of the socket in the part 1503. Still further, it is possible to connect at least one of the parts 1502, 1503 with the rod 1501 in such a way that it can be moved between and fixedly held in at least two predetermined angular positions. FIG. 15 shows that the parts 1502 and 1503 are angularly offset relative to each other (with reference to the longitudinal axis of the rod 1501) through an angle of about 90° (or 270°). Such angle can be reduced or increased and may but need not remain unchanged once the parts 1501, 1502 and 1503 are assembled with each other.

Figure 17:
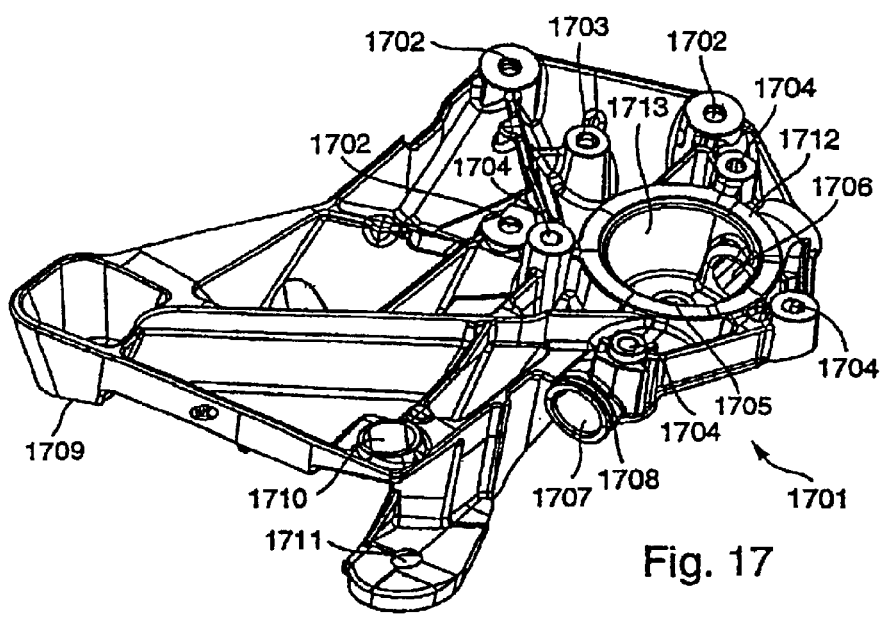
FIG. 17 is a perspective view of a base plate which can be utilized in the power train of the present invention.

FIG. 17 shows a base plate 1701 which can be utilized to secure the two drives for the change-speed transmission to the transmission case (not shown). The first drive (such as the drive 304 shown in FIG. 3) is connectable to the transmission case by means of three screws or other suitable fasteners extending through bores or holes 1702 of the base plate 1701 and into tapped bores or holes in the transmission case. The shaft of the worm wheel forming part of or receiving motion from the first drive extends into a bore or hole 1703 of the base plate 1701. Such mounting of the first drive and of the worm wheel ensures accurate positioning of the first drive on the base plate 1701; in addition, the base plate takes up at least some of the stresses which, in the absence of the just described mounting of the first drive on the base plate, would have to be taken up by the bearings for the shaft of the worm wheel.

The second drive (see the drive 305 in FIG. 3) can be secured to the base plate 1701 by means of four threaded fasteners having externally threaded portions mating with the internal threads of tapped bores or holes 1704 provided in the base plate 1701. The worm wheel of the second drive has a shaft which is receivable in a bore or hole 1705 of the base plate 1701. Again, such securing of the second drive to the base plate 1701 ensures that the mounting of the second drive on the base plate and on the transmission case is at least substantially free of tolerances and the second drive remains in an optimum position for long periods of time.

The shaft of the second drive normally includes a spur gear which meshes with a toothed rack having portions longitudinally movably extending into bores or holes 1706 and 1707 of the base plate 1701. The toothed rack and the mating gear form part of one gear or gear ratio of the transmission whose case or housing mounts the base plate 1701, and this gear of the transmission is received in a pot-shaped compartment or chamber or housing 1713 of the base plate 1701. A surface 1712 of this base plate serves as a support for and preferably sealingly engages a portion of the housing or casing of the first drive. The exposed surface of the housing of the first drive is preferably surrounded or overlapped by a bellows which intercepts dust and/or other impurities. A groove 1708 can be provided in the base plate 1701 to hold the bellows in the requisite position.

The base plate 1701 is secured or affixed to the transmission case at several points. FIG. 17 shows only two (1709 and 1711) of preferably three or even more locations or points where the base plate 1701 can be affixed to the transmission case. The location 1711 is of particular importance and/or advantage because this is the point of simultaneously turnably connecting the base plate 1701 and/or the transmission case with the pivotable gear selecting lever. The connection can be established by a threaded pivot member or shaft which extends through the hole or bore 1710 of the base plate 1701. Such mounting of the gear selecting lever ensures its operation with a high degree of accuracy and reproducibility which is highly desirable because it enhances the accuracy of operation and exerts a beneficial influence upon the kinematics of the change speed transmission and hence of the entire power train.

An important advantage of the base plate 1701 is that it ensures a mounting of the first and second drives which is at least substantially free of tolerances. Furthermore, the bores or holes 1703 and 1705 determine the axial positions of the worm wheels relative to the axes of the fastener means received in the holes or bores 1710 and 1711. Still further, such arrangement ensures accurate mounting of the entire base plate 1701 relative to the locus of articulate connection of the shifting shaft.

The planes including the inlets of the holes or bores 1702 and the inlets of bores or holes 1704 are or can be parallel to each other and are spaced apart from ech other a predetermined distance. However, such presently preferred distributions of the holes or bores 1702, 1704 can be replaced by others, e.g., with a distribution in which the inlets of all of the bores or holes 1702, 1704 are disposed in a common plane.

Figure 18:
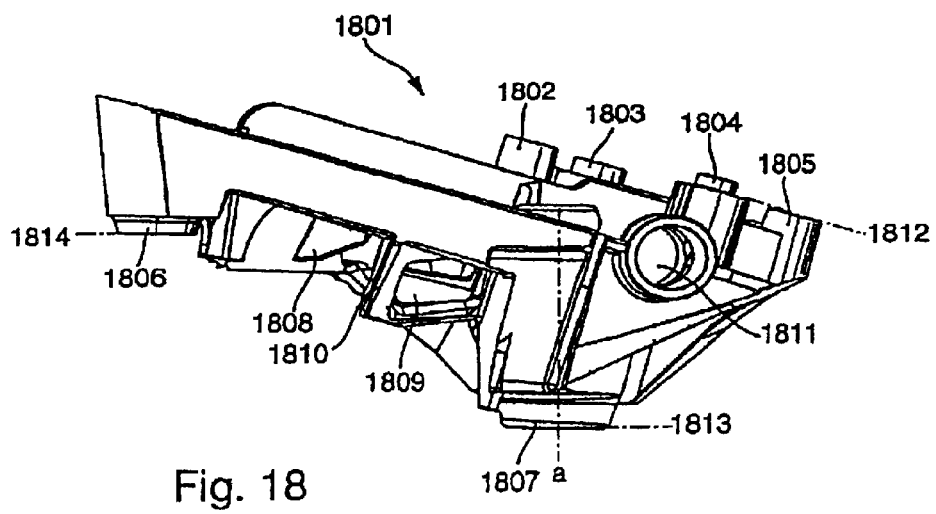
FIG. 18 is an elevational view of a modified base plate.

FIG. 18 shows a base plate 1801 which is or which can constitute a casting and has internally threaded (tapped) sockets 1802, 1803, 1804 and 1805 for threaded fasteners which connect the base plate with the means for shifting the transmission into selected gears. The holes or bores in the tubular portions 1806, 1807 of the base plate 1801 serve to receive fasteners which secure the base plate to the transmission case (not shown in FIG. 18).

If the base plate 1801 is a casting, only the formation of a guide 1811 necessitates the utilization of a pusher. All other holes, bores or passages, channels, ribs and/or others can be made by a properly shaped casting implement and by resorting to suitable bevelled forms, even though the plane 1812 (for securing one of the drives) is not parallel to the planes 1813, 1814 in which the base plate is secured to the transmission case. Particularly the ribs which define the openings 1808 and 1809 are located at such an angle to the main direction of the casting tool that they can be formed without resorting to pushers, cores or analogous implements.

The web 1810 of FIG. 18 is needed to facilitate mounting of the drives on the base plate 1801 and the mounting of the base plate on the transmission case. Thus, this web maintains in requisite position an element which extends through the openings 1808, 1809 of the base plate 1801 and serves to transmit axial movements which are necessary to select a desired transmission ratio.

The dot-dash line a denotes in FIG. 18 the common axis of the shifting lever and of a threaded fastener; this axis can be at least substantially normal to the planes 1813, 1814 at which the base plate 1801 is affixed to the transmission case.

In accordance with a further embodiment, the clutch actuating means and the control means can be assembled into a unit which, however, is separate from the actuating means for the transmission. In such embodiment, the means for securing the unit embodying the clutch actuating means and the control means to the transmission can include a connecting plate 2001 of the type shown in FIG. 20. In order to take into consideration the problems involving vibration, the plate 2001 can exhibit a pronounced stiffness and its mass can be as small as possible; this ensures that the vibrations of the part which is connected to the plate 2001 as well as those attributable to the transmission and/or to the prime mover and/or those developing while the vehicle is in motion can be damped in a highly effective manner. To this end, the plate 2001 is provided, among others, with a plurality of stiffening ribs 2006 which can be made of cast aluminum or another suitable material, the same as the remaining part of the plate 2001.

Figure 20:
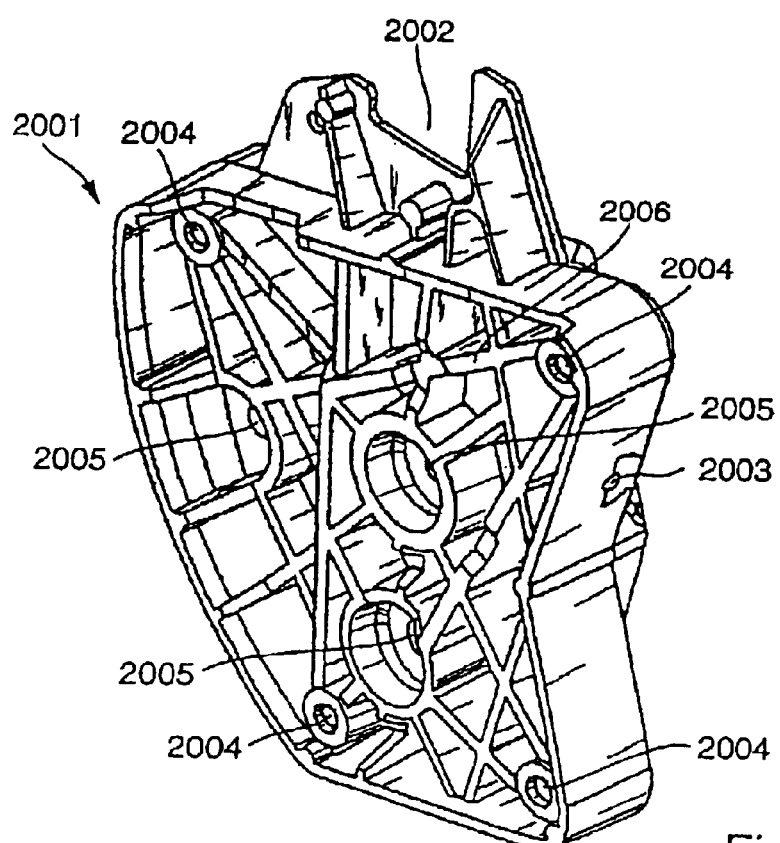
FIG. 20 is a perspective view of a connecting plate.

The plate 2001 is or can be provided with specially designed and/or distributed fastening or securing devices 2005. The characters 2004 denote parts which are utilized to secure the plate 2001 to the unit including the actuating means and the control means. Still further, the plate 2001 can be provided with portions or locations for attachment of this part to other components. FIG. 20 shows a recess 2002 for a container or receptacle containing an operating fluid, and a bore or hole 2003 to facilitate attachment of conductors serving to supply a material or substance and/or to transmit electric and/or other signals.

Depending upon the arrangement of the aforementioned unit including the clutch actuating means and the control means on the transmission, it might be advisable to select the planes for the aforementioned fastening or securing devices 2005 and the securing parts 2004 in such a way that these planes are not parallel to each other. This can often ensure more convenient access to selected parts or regions, e.g., to connections or terminals for cables or other types of signal- and/or energy-transmitting parts on the aforementioned composite unit and/or on the transmission.

Figure 21:
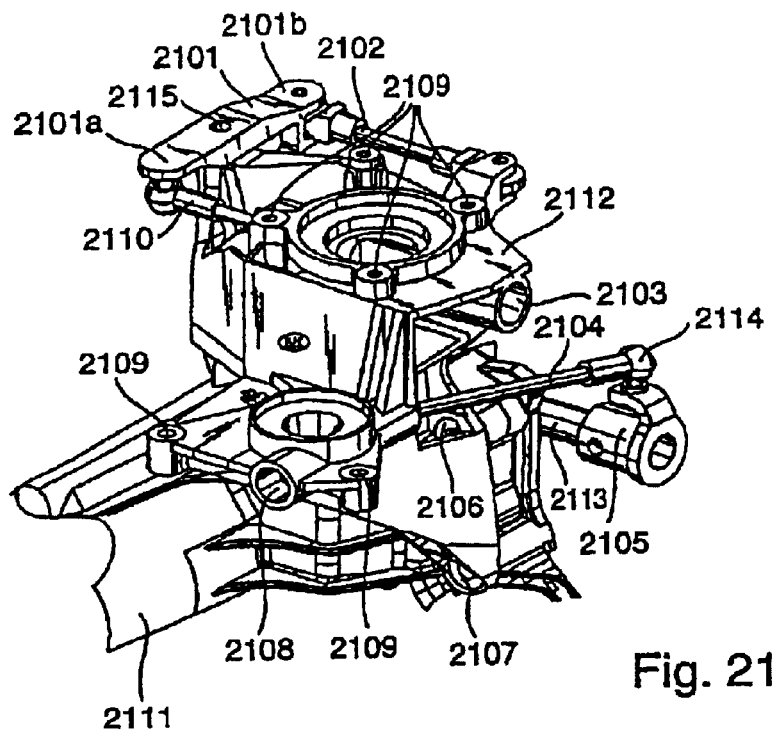
FIG. 21 is a perspective view of a carrier element mounted on a transmission case and of certain parts mounted on the carrier element.
Figure 22:
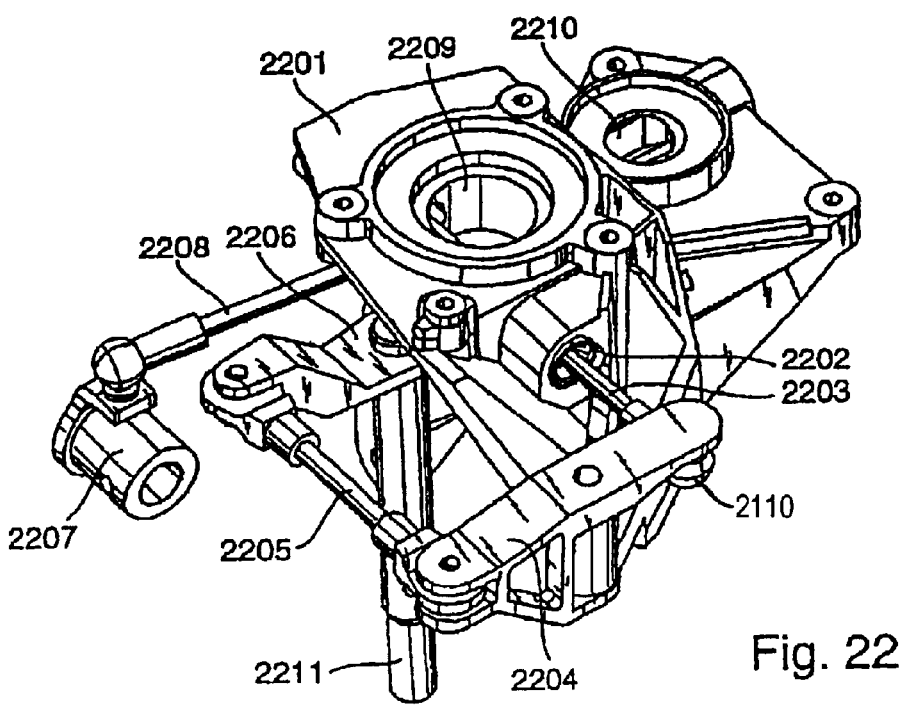
FIG. 22 is a perspective view of another carrier element and of certain parts mounted thereon.

Another embodiment of the invention is illustrated in FIGS. 21 and 22. There is shown a carrier element 2112, 2201 which serves for the tolerance insensitive but highly accurate securing (as far as the selector shaft 2113 and the shifting shaft 2211 are concerned) of the two drives on the transmission to ensure a proper gear selecting and/or gear shifting operation. The part or element 2112 is a carrier for the components or constituents of the selector and shifting kinematics. This carrier is provided with a plurality of securing locations 2109 which are preferably provided with threads (such as internal threads) for reception of externally threaded fasteners such as screws, bolts and/or the like. However, it is equally possible (and frequently preferable) to employ securing locations having through bores or holes for the shanks of rivets or the like.

The drives of the gear selecting and gear shifting means can include (in a manner as already described hereinbefore) a first transmission stage having a worm wheel and a worm and being integrated into the respective drive. A second transmission stage can employ a spur gear which is directly or indirectly connected with the worm wheel, and a toothed rack which meshes with the spur gear. In order to accommodate such second transmission stages, the carrier element is provided with housing-like sections 2209 and 2210 each of which can accommodate at least a portion of the respective second transmission stage.

The drives for the selecting and shifting means are respectively mounted on the carrier elements 2112, 2201 in planes which are or which can be at least substantially parallel to each other and sealingly engage the respective housing-shaped sections 2209 and 2210. The toothed rack for actuation of the gear selecting means is axially movably received in the bore 2108 and is or can be at least substantially normal to a bore or hole 2103 disposed in a parallel plane and serving to receive a toothed rack of the gear shifting means.

In the embodiment of FIGS. 21 and 22, the plane for securing the shifting drive is more distant from the transmission case than the plane for the fastening of the gear selecting drive; this is due to the fact that the shifting shaft 2211 is normal or nearly normal to the selector shaft 2113. In another embodiment, the shifting shaft and the selector shaft are not disposed at right angles to each other, i.e., the distance of the plane of fastening the shifting drive is nearer to the transmission case than the plane for the fastening of the gear selecting drive, or the two planes are disposed at the same distance from the transmission case. This can involve certain changes in the manner of mounting the two drives.

The fastening location 2115 serves for reception of a wiper 2101, 2204 which is pivotable in the plane of the shifting drive or in a plane which is parallel to the just mentioned plane. The levers 2101a and 2101b of the respective wipers preferably have identical or nearly identical lengths. However, the present invention further encompasses modifications of the just described arrangement. The kinematics can render it necessary to employ a lever 2101a which is shorter or longer than the lever 2101b, i.e., to ensure the establishment of a predetermined transmission ratio of the movement.

The lever 2101a is articulately connected with a rod 2203 by a universal joint 2110.

Figure 23:
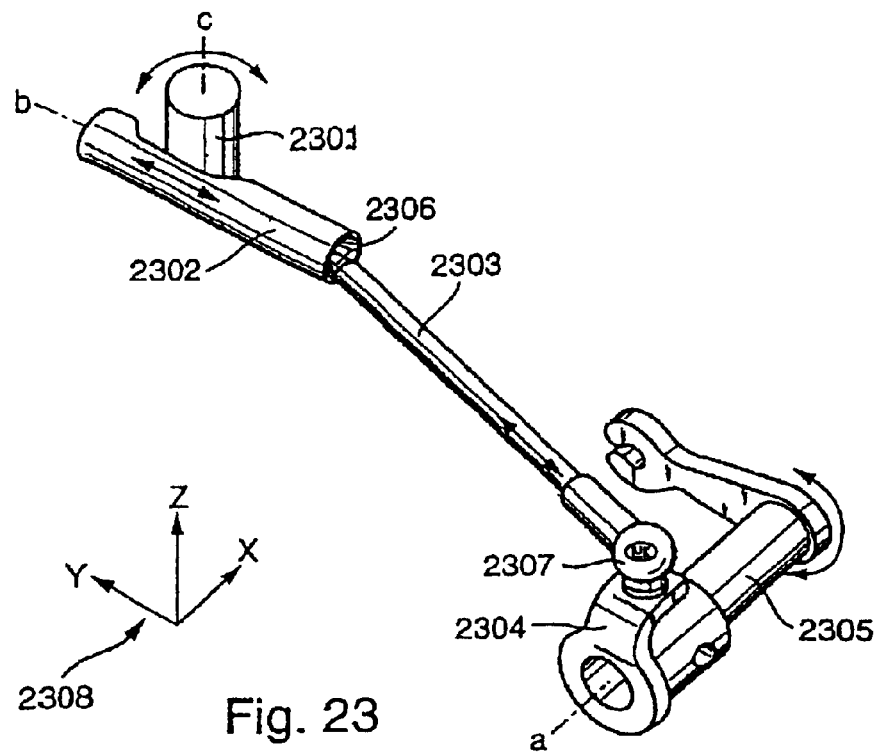
FIG. 23 is a perspective view of the kinematics of a selector path.

FIG. 23 illustrates the selector kinematics of the embodiment which is shown in FIGS. 21 and 22. The spur gear 2301 can receive motion from the selector drive and serves to transmit axial motion to the associated toothed rack 2302 in the bore 2108 (refer to FIG. 21). The motion transmitting means includes the rod 2104 of FIG. 21 (corresponding to the part 2208 in FIG. 22 and to the rod 402 shown in FIG. 4), and the part 2303 (FIG. 23). The articulate connection between the parts 2302, 2303 of FIG. 23 includes a universal joint 2306 which can be of the type shown in and already described with reference to FIGS. 7a to 7c. This joint preferably includes a spherical head borne by the part 2303 and being free to swivel (within limits) in the recess of a spherical socket at the adjacent end of the toothed rack 2302. The part 2303 is designed to ensure tensioning-free transmission of motion from and/or to the toothed rack 2302. The part 2303 of FIG. 23 corresponds to the element 2104 of FIG. 21 and can transmit motion by way of the parts 2307, 2304 to the selector shaft 2113, 2305. Articulate connection between the element 2104, 2208, 2303 and the lever element 2105 (corresponding to the part 2207 of FIG. 22 and to the part 403 in FIG. 4), 2207, 2304 is established by spherical joints including the parts 2114 (corresponding to the part 410 shown in FIG. 4) and 2307.

The directions of movement of the mobile parts shown in FIG. 23 are indicated by arrows. The axes a, b and c are disposed at right angles or close to right angles to each other. Referring to the Cartesian coordinate system 2308 of FIG. 23, the axis a of the selector shaft 2305 is parallel or nearly parallel to the x-axis of the coordinate system 2308, the axis b of the toothed rack 2302 is at least substantially parallel to the y-axis of the system 2308, and the axis c of the spur gear 2301 is at least substantially parallel to the z-axis of the system 2308. A shifting displacement of the joint between the element 2303 and the lever element 2304 relative to the axis b is compensated for primarily by the element 2303 the end portions of which are articulately connected to the adjacent parts by the spherical joints 2306 and 2307.

Figure 24:
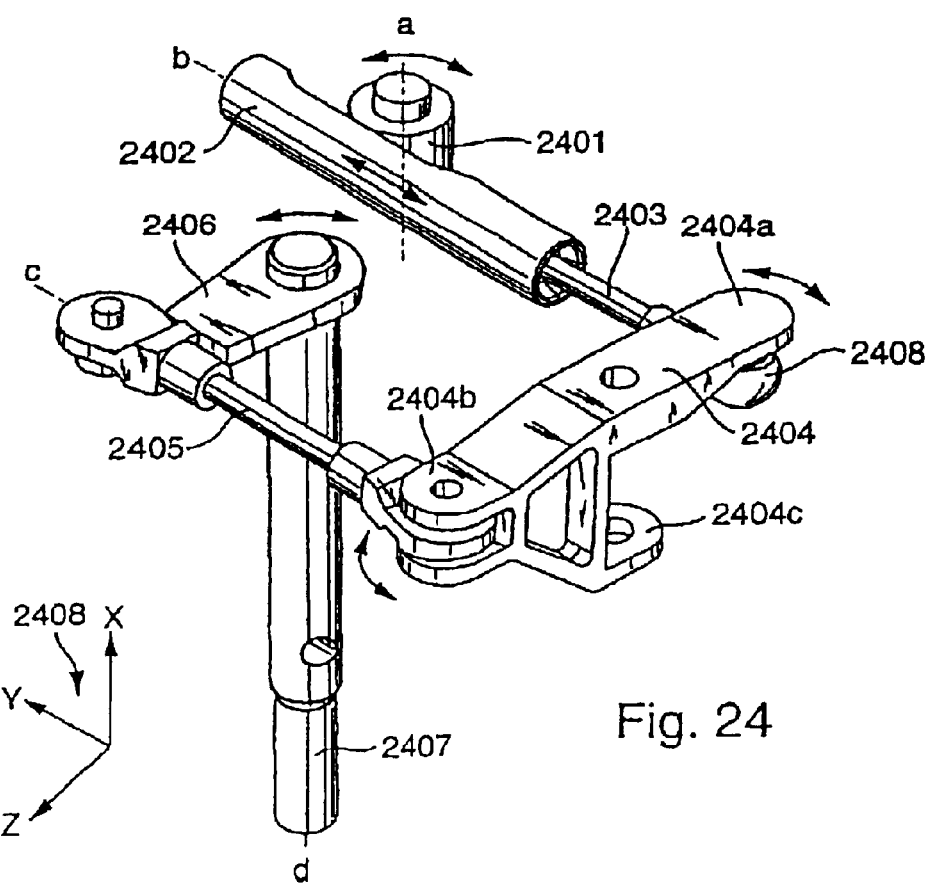
FIG. 24 is a similar perspective view of the kinematics of a shifting path.

FIG. 24 illustrates the shifting kinematics of the embodiment which is depicted in FIGS. 21 and 22. The spur gear 2401 receives torque from the respective (shifting) drive and transmits motion to the toothed rack 2402 which is reciprocable in the bores 2103 (FIG. 21) and 2202 (FIG. 22). The element 2403 of FIG. 24 for the tensioning-free transmission of axial movements can be constructed and mounted in a manner as shown in and as described with reference to FIGS. 7a to 7c and permits tension-free transmission of motion, by way of the spherical (universal) joint 2408, to the wiper 2404 which, in turn, transmits motion, by way of the elements 2405, 2205 and 2102, to the lever element 2406 (corresponding to the element 2206) by way of the respective shifting shaft 2407, 2211.

The wiper 2404 comprises two levers 2404a and 2404b whch have or which can have identical lengths. A legs 2404c of the wiper 2404 permits for an attachment with freedom of angular movement by way of a pin which secures it to the carrier element 2112, 2201. With reference to the Cartesian coordinate system 2408 of FIG. 24, the axis a of the spur gear 2401 and the axis d of the shifting shaft 2407 are at least substantially parallel to the x-axis of the system 2408, and the axis b of the toothed rack 2402 as well as the axis c of the element 2405 are at least substantially parallel to the y-axis of the system 2408. The toothed rack 2402 and the element 2403, the wiper 2404 and the element 2405 are disposed in or close to a common plane and are movable in such plane.

A gear ratio selecting movement influences the shifting operation due to coupling of the selecting and shifting kinematics. Therefore, the kinematics are designed in such a way that, during a gear shifting movement, the influence upon the selecting kinematics (in the embodiment of FIGS. 21 to 24) is so minimal that a turning (operation) of the selector drive in the course of a complete shifting movement—by taking into consideration the plays in the transmission path of the selector kinematics—is below an increment of the selector drive sensorics and, therefore, such angular movement is not detected at all; this prevents an undesirable secondary or afterregulation of the selector drive.

The embodiment including the structure shown in FIGS. 21 and 22 exhibits the same advantages as that employing the base plates 1701, 1801 which are shown in and were described with reference to FIGS. 17 and 18. This is achieved even though the carrier elements 2112 and 2201 of FIGS. 21 and 22 are somewhat different from the corresponding parts (base plates) 1701 (FIG. 17) and 1801 (FIG. 18).

The present invention further constitutes an improvement over and a further development of those disclosed in the assignee's earlier filed German patent applications Serial Nos. 19734050 (corresponding to British patent application Serial No. 2330186 A), 19804214, 19804217 (corresponding to British patent application Serial No. 2338272 A), 19814126 (corresponding to British patent application Serial No. 2338768 A), 19928263 (corresponding to the PCT application Serial No. WO 00/79153 A1), 19930869 (corresponding to the PCT application Serial No. WO 01/02757 A1) and 19937544. The aforementioned German patent application Serial No. 19804214 corresponds to published German patent application Serial No. DE 199 04 021 A1, and the aforementioned German patent application Serial No. 19937544 corresponds to published German patent application Serial No. DE 100 34 736 A1. The disclosures of all of the just enumerated applications, as well as of the continuations and/or divisions thereof, are also incorporated by reference in the disclosure of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for use in motor vehicles and, therefore, such adaptations should and are intended to be comprehended within the meaning and range of equivalence of the appended claims.

What is claimed is:

1. A motor vehicle embodying a power train which includes:

a prime mover;

a variable-speed transmission having a plurality of ratios;
a torque transmitting unit actuatable to connect rotary output element of said prime mover with rotary input element of said transmission;
means for actuating said torque transmitting unit;
means for varying a speed of said transmission, including a first drive for selecting one of said ratios and a second drive for shifting the transmission into the selected ratio, one of said drives including means for transmitting rotary movements and the other of said drives including means for transmitting translatory movements;
automatic control means for said actuating means and said speed varying means for transmitting signals to said control means; and
kinematic transmission connecting said drives with said transmission, including means for converting rotary movements transmitted by said one drive into translatory movements and means for converting translatory movements constituting converted rotary movements into rotary movements,
wherein one of said converting means includes a toothed rack comprising a first portion containing a material having a first melting point and including the teeth thereof and a second portion containing a material having a second melting point lower than said first melting point, one of said converting means including a pivotable lever arranged to transmit tension-free translatory movements and receiving motion from said second portion of said toothed rack.

2. The vehicle of claim 1, wherein said means for converting rotary movements transmitted by said one drive includes a worm and a worm wheel mating with said worm, said means for converting translatory movements including a pivotable selector arm and an axially movable coupling rod connecting one of said worm and worm wheel with said pivotable selector.

3. The vehicle of claim 1, wherein said means for varying the speed of said transmission further includes a support mounting at least a portion of at least one of said converting means on a housing of said transmission.

4. The vehicle of claim 1, wherein said means for the speed of said transmission further includes a base plate arranged to mount said drives on a housing of said transmission.

5. The vehicle of claim 1, wherein said means for varying the speed of said transmission further includes a base plate, one of said drives including a rotary worm wheel arranged to be supported by said base plate.

6. The vehicle of claim 1, wherein said means for varying the speed of said transmission further includes a base plate comprising a compartment for one of said drives.

7. The vehicle of claim 1, wherein said means for varying the speed of said transmission further includes a base plate and means for securing said base plate to a case of said transmission, said securing means including an element tumably mounting a shifting lever of said kinematic transmission lines.

8. The vehicle of claim 1, wherein one of said ratios is defined by a spur gear and a toothed rack, one of said drives including a resilient arrangement and said spur gear being plugged into said resilient arrangement.

9. The vehicle of claim 1, wherein said lever is arranged to receive motion from said second portion of said toothed rack by way of an elongated push rod consisting at least in part of material having a melting point higher than said second melting point.

10. The vehicle of claim 1, wherein at least one of said converting means comprises at least one universal joint including a spherical head and a complementary socket receiving said head for swiveling movement relative thereto, at least one of said head and said socket constituting an article made in a machine selected from the group consisting of casting and injection molding machines.

11. The vehicle of claim 1, wherein said converting means include a toothed rack and a member for tension free transmission-shifting movements, at least one of said rack and said member consisting entirely of a plastic material.

12. The vehicle of claim 1, wherein said converting means include at least one joint having a sphere, a complementary socket for said sphere, and a film of a pasty substance, including wax, provided between said sphere and said socket.

13. The vehicle of claim 1, wherein said converting means include at least one joint having a sphere and a complementary socket for said sphere, at least a portion of said sphere consisting of a plastic material which undergoes minimal shrinkage in response to cooling.

14. The vehicle of claim 1, wherein at least one of said converting means comprises a toothed rack having an axis and including teeth with a pitch circle disposed in a plane located at least close to said axis.

15. The vehicle of claim 1, wherein one of said converting means is arranged to select transmission ratios and said transmission includes a shifting shaft, each of said converting means including a plurality of components and each of said pluralities including a last component connected with said shaft, said last component of said one converting means constituting the last component of the other of said converting means.

16. The vehicle of claim 1, wherein said converting means are mechanically coupled to each other so that an actuation of one of said converting means entails an actuation an of the other of said converting means without constituting a departure from a predetermined mode of operation of said other converting means.

17. The vehicle of claim 1, wherein one of said converting means is arranged to select desired ratios of said transmission and the other of said converting means is arranged to shift the transmission into a selected ratio, said one and said other converting means being operatively connected with each other in such a way that an actuation of said other converting means entails no actuation or at most a negligible actuation of said one converting means.

18. The vehicle of claim 1, wherein said means for converting rotary movements transmitted by said one drive includes an entraining member rotatable about a predetermined axis, an axially movable motion transmitting member and an eccentric connecting said entraining member with said motion transmitting member.

19. The vehicle of claim 18, wherein said eccentric includes a universal joint.

20. The vehicle of claim 1, wherein said one converting means further includes universal joints connecting one portion of said toothed rack with said lever.

21. The vehicle of claim 20, wherein at least one of said universal joints includes a ball and a socket receiving said ball for swiveling movement relative thereto.

22. A motor vehicle embodying a power train which includes:
a prime mover;
a variable-speed transmission having a plurality of ratios;
a torque transmitting unit actuatable to connect rotary output element of said prime mover with rotary input element of said transmission;

means for actuating said torque transmitting unit;

means for varying a speed of said transmission, including a first drive for selecting one of said ratios and a second drive for shifting the transmission into the selected ratio, one of said drives including means for transmitting rotary movements and the other of said drives including means for transmitting translatory movements;

automatic control means for said actuating means and said speed varying means;

means for transmitting signals to said control means; and kinematic transmission connecting said drives with said transmission, including means for converting rotary movements transmitted by said one drive into translatory movements and means for converting translatory movements constituting converted rotary movements into rotary movements, wherein at least one of said converting means comprises at least one universal joint including a spherical head and a complementary socket for said head, said joint connecting a toothed rack of said at least one converting means with a pivotable lever and said rack including a casting of one piece with one of said head and said socket, said one converting means further comprising a member carrying the other of said head and said socket.

23. The vehicle of claim 22, wherein said means for varying the speed of said transmission further includes a support mounting at least a portion of at least one of said converting means on a housing of said transmission.

24. The vehicle of claim 22, wherein said means for the speed of said transmission further includes a base plate arranged to mount said drives on a housing of said transmission.

25. The vehicle of claim 22, wherein said means for varying the speed of said transmission further includes a base plate, one of said drives including a rotary worm wheel arranged to be supported by said base plate.

26. The vehicle of claim 22, wherein said means for varying the speed of said transmission further includes a base plate comprising a compartment for one of said drives.

27. The vehicle of claim 22, wherein said means for varying the speed of said transmission further includes a base plate and means for securing said base plate to a case of said transmission, said securing means including an element turnably mounting a shifting lever of said kinematic transmission lines.

28. The vehicle of claim 22, wherein one of said ratios is defined by a spur gear and a toothed rack, one of said drives including a resilient arrangement and said spur gear being plugged into said resilient arrangement.

29. A motor vehicle embodying a power train which includes:

a prime mover;

a variable-speed transmission having a plurality of ratios;

a torque transmitting unit actuatable to connect rotary output element of said prime mover with rotary input element of said transmission;

means for actuating said torque transmitting unit;

means for varying a speed of said transmission, including a first drive for selecting one of said ratios and a second drive for shifting the transmission into the selected ratio, one of said drives including means for transmitting rotary movements and the other of said drives including means for transmitting translatory movements;

automatic control means for said actuating means and said speed varying means for transmitting signals to said control means; and kinematic transmission connecting said drives with said transmission, including means for converting rotary movements transmitted by said one drive into translatory movements and means for converting translatory movements constituting converted rotary movements into rotary movements, wherein said converting means include a toothed rack, a member for tension-free transmission of transmission-shifting movements and means for articulately connecting said toothed rack with said member, said toothed rack, said member and said connecting means consisting of a material capable of withstanding temperatures which arise in actual use of the transmission without affecting the articulate connection between said toothed rack and said member.

30. The vehicle of claim 29, wherein said means for varying the speed of said transmission further includes a support mounting at least a portion of at least one of said converting means on a housing of said transmission.

31. The vehicle of claim 29, wherein said means for the speed of said transmission further includes a base plate arranged to mount said drives on a housing of said transmission.

32. The vehicle of claim 29, wherein said means for varying the speed of said transmission further includes a base plate, one of said drives including a rotary worm wheel arranged to be supported by said base plate.

33. The vehicle of claim 29, wherein said means for varying the speed of said transmission further includes a base plate comprising a compartment for one of said drives.

34. The vehicle of claim 29, wherein said means for varying the speed of said transmission further includes a base plate and means for securing said base plate to a case of said transmission, said securing means including an element turnably mounting a shifting lever of said kinematic transmission lines.

35. The vehicle of claim 29, wherein one of said ratios is defined by a spur gear and a toothed rack, one of said drives including a resilient arrangement and said spur gear being plugged into said resilient arrangement.

36. A motor vehicle embodying a power train which includes:

a prime mover;

a variable-speed transmission having a plurality of ratios;

a torque transmitting unit actuatable to connect rotary output element of said prime mover with rotary input element of said transmission;

means for actuating said torque transmitting unit;

means for varying a speed of said transmission, including a first drive for selecting one of said ratios and a second drive for shifting the transmission into the selected ratio, one of said drives including means for transmitting rotary movements and the other of said drives including means for transmitting translatory movements;

automatic control means for said actuating means and said speed varying means for transmitting signals to said control means; and kinematic transmission connecting said drives with said transmission, including means for converting rotary movements transmitted by said one drive into translatory movements and means for converting translatory movements constituting converted rotary movements into rotary movements, wherein said converting means include at least one joint having a sphere and a complementary socket for said sphere, at least one of said sphere and said socket constituting a casting having undergone a predetermined cooling treatment.

37. The vehicle of claim 36, wherein said means for varying the speed of said transmission further includes a support mounting at least a portion of at least one of said converting means on a housing of said transmission.

38. The vehicle of claim 36, wherein said means for the speed of said transmission further includes a base plate arranged to mount said drives on a housing of said transmission.

39. The vehicle of claim 36, wherein said means for varying the speed of said transmission further includes a base plate, one of said drives including a rotary worm wheel arranged to be supported by said base plate.

40. The vehicle of claim 36, wherein said means for varying the speed of said transmission further includes a base plate comprising a compartment for one of said drives.

41. The vehicle of claim 36, wherein said means for varying the speed of said transmission further includes a base plate and means for securing said base plate to a case of said transmission, said securing means including an element tumably mounting a shifting lever of said kinematic transmission lines.

42. The vehicle of claim 36, wherein one of said ratios is defined by a spur gear and a toothed rack, one of said drives including a resilient arrangement and said spur gear being plugged into said resilient arrangement.

43. A motor vehicle embodying a power train which includes:
   a prime mover;
   a variable-speed transmission having a plurality of ratios;
   a torque transmitting unit actuatable to connect rotary output element of said prime mover with rotary input element of said transmission;
   means for actuating said torque transmitting unit;
   means for varying a speed of said transmission, including a first drive for selecting one of said ratios and a second drive for shifting the transmission into the selected ratio, one of said drives including means for transmitting rotary movements and the other of said drives including means for transmitting translatory movements;
   automatic control means for said actuating means and said speed varying means for transmitting signals to said control means; and
   kinematic transmission connecting said drives with said transmission, including means for converting rotary movements transmitted by said one drive into translatory movements and means for converting translatory movements constituting converted rotary movements into rotary movements,
   wherein said converting means include a pivotable shifting lever, a mobile shifting shaft, an element for transmission of motion from said lever and a crosshead for transmission of motion between said element and said shaft.

44. The vehicle of claim 43, wherein said means for varying the speed of said transmission further includes a support mounting at least a portion of at least one of said converting means on a housing of said transmission.

45. The vehicle of claim 43, wherein said means for the speed of said transmission further includes a base plate arranged to mount said drives on a housing of said transmission.

46. The vehicle of claim 43, wherein said means for varying the speed of said transmission further includes a base plate, one of said drives including a rotary worm wheel arranged to be supported by said base plate.

47. The vehicle of claim 43, wherein said means for varying the speed of said transmission further includes a base plate comprising a compartment for one of said drives.

48. The vehicle of claim 43, wherein said means for varying the speed of said transmission further includes a base plate and means for securing said base plate to a case of said transmission, said securing means including an element tumably mounting a shifting lever of said kinematic transmission lines.

49. The vehicle of claim 43, wherein one of said ratios is defined by a spur gear and a toothed rack, one of said drives including a resilient arrangement and said spur gear being plugged into said resilient arrangement.

50. A motor vehicle embodying a power train which includes:
   a prime mover;
   a variable-speed transmission having a plurality of rations;
   a torque transmitting unit actuatable to connect a rotary output element of said prime mover with a rotary input element of said transmission;
   means for actuating said torque transmitting unit;
   means for varying a speed of said transmission, including a first drive for selecting one of said ratios and a second drive for shifting the transmission into the selected ratio, one of said drives including means for transmitting rotary movements and the other of said drives including means for transmitting translatory movements;
   automatic control means for said actuating means and said speed varying means;
   a kinematic transmission line connecting said drives with said transmission, including means for converting movements transmitted by said second drive into movements entailing a shifting of the transmission into a selected ratio and comprising a first stage receiving motion from said second drive, an elastic shifting device, a second stage receiving motion from said shifting device and having means for converting rotary movements into translatory movements, an element for tension-free transmission of translatory movements, and a pivotable lever operatively connected with said element and arranged to transform rotary movements into axial shifting movements; and
   a base plate mounting at least one of said drives and means for securing said base plate to a housing of said transmission, said base plate constituting a casting and having reinforcing ribs provided with openings and having an orientation such that, during casting, the openings in the ribs are formed without resort to auxiliary casting tools.

51. The vehicle of claim 50, wherein one of said stages includes a worm and a worm wheel mating with said worm, the other of said stages including a pinion and a toothed rack mating with said pinion.

52. The vehicle of claim 50, further comprising a base plate mounted on a housing of said transmission and supporting at least one of said drives, said base plate having a compartment for a portion of said transmission.

53. The vehicle of claim 50, further comprising a base plate supporting said drives and being mounted on a case of said transmission, said base plate having at least one window affording access to said transmission.

54. The vehicle of claim 50, further comprising a base plate supporting at least one of said drives and being borne by a case of said transmission, said base plate having at least one reinforcement.

55. The vehicle of claim 50, further comprising a base plate mounting at least one of said drives and means for securing said base plate to a housing of said transmission, said securing means including an element tumably mounting a shifting lever of said kinematic transmission line.

56. The vehicle of claim 50, further comprising a base plate supporting at least one of said drives and means for securing said base plate to a housing of said transmission, said securing means being affixed to said base plate under tension to thus reduce the likelihood of unintentional separation.

57. The vehicle of claim 50, further comprising base plate mounting said first and second drives.

58. The vehicle of claim 57, wherein at least of said stages includes a worm and a worm wheel mating with said worm and mounted in said base plate.

* * * * *